US010620612B2

United States Patent
Chao et al.

(10) Patent No.: US 10,620,612 B2
(45) Date of Patent: Apr. 14, 2020

(54) PREDICTIVE MAINTENANCE AND PROCESS SUPERVISION USING A SCALABLE INDUSTRIAL ANALYTICS PLATFORM

(71) Applicant: Rockwell Automation Technologies, Inc., Mayfield Heights, OH (US)

(72) Inventors: Kevin Chao, Mountain View, CA (US); Pradeep Kaushik, Sunnyvale, CA (US); Richard W. Sze, Saratoga, CA (US); John A. Genovesi, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 7 days.

(21) Appl. No.: 15/936,870

(22) Filed: Mar. 27, 2018

(65) Prior Publication Data
US 2018/0356800 A1 Dec. 13, 2018

Related U.S. Application Data

(60) Provisional application No. 62/516,890, filed on Jun. 8, 2017.

(51) Int. Cl.
*G05B 19/41* (2006.01)
*G05B 19/418* (2006.01)
(Continued)

(52) U.S. Cl.
CPC ..... *G05B 19/41835* (2013.01); *G05B 19/406* (2013.01); *G05B 19/408* (2013.01);
(Continued)

(58) Field of Classification Search
None
See application file for complete search history.

(56) References Cited

U.S. PATENT DOCUMENTS 6,421,571 B1 7/2002 Spriggs et al.
8,031,638 B2 10/2011 Ackermann et al.
(Continued)

FOREIGN PATENT DOCUMENTS

CN 103217935 A 7/2013
CN 103685442 A 3/2014
(Continued)

OTHER PUBLICATIONS

European Search Report for European Patent Application No. EP17175165.4 dated Aug. 10, 2017, 9 pages.
(Continued)

*Primary Examiner* — Jason Lin
(74) *Attorney, Agent, or Firm* — Amin, Turocy & Watson, LLP

(57) ABSTRACT

A scalable industrial data ingestion and analysis architecture integrates and collects data from multiple diverse sources at one or more industrial facilities. Data sources can include plant-level industrial devices and higher-level business systems. The data can be integrated and collected from multiple sources at an on-premise edge or gateway device, which sends the data to event queues on the cloud platform. The data queues orchestrate and store the data on cloud storage, and an analytics layer performs business analytics or other types of analysis on the stored data to produce various outcomes. Similar analytic platforms can also be implemented at the device level, and analytic functions can be scaled between the device level and higher levels in accordance with the scope of a given analytic function.

20 Claims, 21 Drawing Sheets

(51) Int. Cl.
*G06F 16/10* (2019.01)
*G06F 16/907* (2019.01)
*G05B 19/406* (2006.01)
*G05B 19/408* (2006.01)

(52) U.S. Cl.
CPC ... *G05B 19/4185* (2013.01); *G05B 19/41885* (2013.01); *G06F 16/10* (2019.01); *G06F 16/907* (2019.01); *G05B 2219/31326* (2013.01); *G05B 2219/31348* (2013.01); *G05B 2219/32403* (2013.01); *G05B 2219/34334* (2013.01); *G05B 2219/35001* (2013.01); *G05B 2219/35011* (2013.01)

(56) References Cited

U.S. PATENT DOCUMENTS

| | | | | |
|---|---|---|---|---|
| 8,674,993 | B1* | 3/2014 | Fleming | G06Q 40/06 345/440 |
| 9,329,751 | B2* | 5/2016 | Bardhan | G06F 16/283 |
| 9,645,979 | B2* | 5/2017 | Shinzato | G06F 17/21 |
| 9,760,601 | B2* | 9/2017 | Burke | G06Q 10/00 |
| 9,958,860 | B2 | 5/2018 | Rischar et al. | |
| 10,048,995 | B1* | 8/2018 | Dikhit | G06F 11/0754 |
| 2006/0161597 | A1 | 7/2006 | Ougarov et al. | |
| 2007/0094181 | A1* | 4/2007 | Tayebnejad | G06Q 40/08 706/21 |
| 2008/0114474 | A1 | 5/2008 | Campbell et al. | |
| 2009/0228176 | A1* | 9/2009 | Mintah | E02F 3/435 701/50 |
| 2010/0292825 | A1* | 11/2010 | Taylor | C25C 3/06 700/108 |
| 2012/0078432 | A1 | 3/2012 | Weatherhead et al. | |
| 2013/0124465 | A1 | 5/2013 | Pingel et al. | |
| 2013/0212420 | A1 | 8/2013 | Lawson et al. | |
| 2014/0047107 | A1 | 2/2014 | Maturana et al. | |
| 2014/0222522 | A1* | 8/2014 | Chait | G06Q 10/0637 705/7.36 |
| 2014/0226460 | A1 | 8/2014 | Kretschmann et al. | |
| 2014/0335480 | A1 | 11/2014 | Asenjo et al. | |
| 2014/0337000 | A1* | 11/2014 | Asenjo | G06F 17/5009 703/13 |
| 2014/0337429 | A1* | 11/2014 | Asenjo | H04L 65/403 709/204 |
| 2015/0120009 | A1 | 4/2015 | Kilian | |
| 2015/0277406 | A1 | 10/2015 | Maturana et al. | |
| 2015/0281356 | A1 | 10/2015 | Maturana et al. | |
| 2015/0316904 | A1 | 11/2015 | Govindaraj et al. | |
| 2016/0179599 | A1* | 6/2016 | Deshpande | H04L 65/601 714/807 |
| 2016/0299999 | A1 | 10/2016 | James et al. | |
| 2017/0351241 | A1* | 12/2017 | Bowers | G05B 19/406 |

FOREIGN PATENT DOCUMENTS

| | | |
|---|---|---|
| EP | 2592812 | 5/2013 |
| EP | 2801935 | 11/2014 |
| EP | 3018596 | 5/2016 |

OTHER PUBLICATIONS

European Search Report for European Patent Application No. EP171751662 dated Aug. 14, 2017, 9 pages.
Feddersen, "Real-Time Event Processing with Microsoft Azure Stream Analytics," Reference Architecture, Jan. 2015, 31 pages.
Non-Final Office Action received for U.S. Appl. No. 15/489,091 dated Feb. 25, 2019, 26 pages.
Non-Final Office Action received for U.S. Appl. No. 15/609,301 dated Dec. 13, 2018, 35 pages.
Non-Final Office Action received for U.S. Appl. No. 15/609,323 dated Dec. 31, 2018, 34 pages.
Communication pursuant to Article 94(3) received for EP Application No. 17175165.4 dated Jan. 18, 2019, 8 pages.
Communication pursuant to Article 94(3) received for EP Application No. 17175166.2 dated Dec. 20, 2018, 10 pages.
Final Office Action received for U.S. Appl. No. 15/609,301 dated May 22, 2019, 35 pages.
Final Office Action received for U.S. Appl. No. 15/609,323 dated May 23, 2019, 32 pages.
Non-Final Office Action received for U.S. Appl. No. 15/609,301 dated Sep. 3, 2019, 35 pages.
Notice of Allowance received for U.S. Appl. No. 15/609,323 dated Aug. 12, 2019, 37 pages.
Non-Final Office Action received for U.S. Appl. No. 15/936,940 dated Sep. 9, 2019, 65 pages.
First Office Action received for Chinese Patent Application Serial No. 201710432617.4 dated Jun. 20, 2019, 19 pages (Including English Translation).
First Office Action received for Chinese Patent Application Serial No. 201710433517.3 dated Jun. 21, 2019, 19 pages (Including English Translation).
Notice of Allowance received for U.S. Appl. No. 15/609,301 dated Nov. 21, 2019, 57 pages.
Summons to attend oral proceedings pursuant to Rule 115(1) EPC received for EP Patent Application Serial No. 17175165.4 dated Nov. 21, 2019, 32 pages. Second Office Action received for Chinese Patent Application Serial No. 201710432617.4 dated Jan. 15, 2020, 24 pages (Including English Translation).
Summons to attend oral proceedings pursuant to Rule 115(1) EPC received for EP Patent Application Serial No. 17175165.4 dated Nov. 21, 2019, 32 pages.
Wikipedia, "Modularity", URL: https://en.wikipedia.org/w/index.php?title=Modularity&oldid=714646548, Apr. 11, 2016, pp. 1-10.
Wikipedia, "Modular design", URL: https://en.wikipedia.org/w/index.php?title=Modular_design&oldid=721647382, May 23, 2016, pp. 1-4.
Wikipedia, "Modular programming", URL: https://en.wikipedia.org/w/index.php?title=Modular_programming&oldid=723013178, May 31, 2016, pp. 1-5.
Second Office Action received for Chinese Patent Application Serial No. 201710432617.4 dated Jan. 15, 2020, 24 pages (Including English Translation).
Second Office Action received for Chinese Patent Application Serial No. 201710433517.3 dated Feb. 3, 2020, 23 pages (Including English Translation).

* cited by examiner

PREDICTIVE MAINTENANCE AND PROCESS SUPERVISION USING A SCALABLE INDUSTRIAL ANALYTICS PLATFORM

CROSS-REFERENCE TO RELATED APPLICATIONS

This application claims priority to U.S. Provisional Application Ser. No. 62/516,890, filed on Jun. 8, 2017, and entitled "SCALABLE INDUSTRIAL ANALYTICS PLATFORM," the entirety of which is incorporated herein by reference.

BACKGROUND

The subject matter disclosed herein relates generally to industrial automation systems, and, for example, to systems and methods for monitoring industrial enterprises in connection with reporting, notifying, and performing supervisory control.

BRIEF DESCRIPTION

The following presents a simplified summary to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a device interface component configured to receive, from industrial devices and systems at one or more industrial facilities, data files that are formatted according to different file formats; a metadata generation component configured to generate relationship metadata identifying correlations between data items contained in the data files and to store the data items in association with the relationship metadata; an analysis component configured to identify, based on an analysis on the data items and the relationship metadata, a performance issue associated with one or more of the industrial devices and systems; and a presentation component configured to send a dashboard interface to a client device, the dashboard interface rendering a notification of the performance issue and a recommended countermeasure determined to mitigate the performance issue.

Also, one or more embodiments provide a method, comprising receiving, by a system comprising a processor, data files from industrial devices and systems at one or more industrial facilities, wherein the data files accord to different file formats; generating, by the system, relationship metadata identifying correlations between data items contained in the data files; storing, by the system, the data items in association with the relationship metadata; identifying, by the system based on an analysis on the data items and the relationship metadata, a performance issue associated with one or more of the industrial devices and systems; and sending, by the system, a dashboard interface to a client device, wherein the dashboard interface displays a notification of the performance issue and a recommended countermeasure determined to mitigate the performance issue.

Also, one or more embodiments provide a non-transitory computer-readable medium having stored thereon executable components that, in response to execution, cause a system comprising a processor to perform operations, the operations comprising: receiving data files from industrial devices and systems at one or more industrial facilities, wherein the data files accord to different file formats; identifying correlations between data items contained in the data files; generating relationship metadata recording the correlations; storing the data items in association with the relationship metadata; identifying, based on an analysis on the data items and the relationship metadata, a performance issue associated with one or more of the industrial devices and systems; and rendering a dashboard interface on a client device, wherein the dashboard interface displays a notification of the performance issue and a recommended countermeasure determined to mitigate the performance issue.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
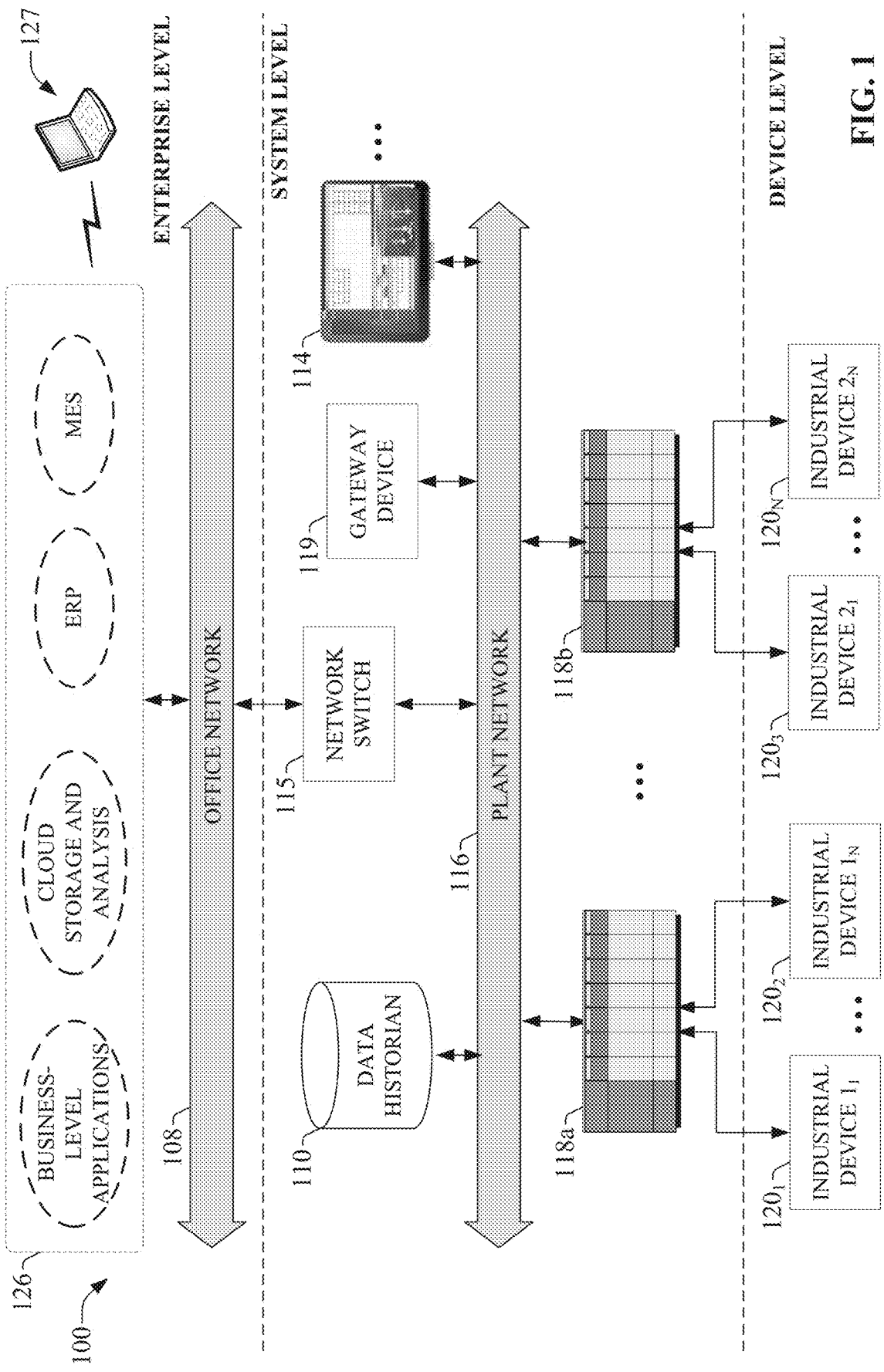
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

Some industrial control systems can also include devices that are directly connected to the plant network rather than being connected to and controlled by an industrial controller. This connectivity allows for a wider variety of logical control topologies where system-level and machine-level control are no longer limited to industrial controllers.

FIG. 1 is a block diagram of an example industrial control environment 100. In this example, a number of industrial controllers 118 as well as industrial devices 120 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial devices may also interact with controllers or may perform control system operations independently. One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include input devices that provide data relating to the controlled industrial systems to the industrial controllers 118, output devices that respond to control signals generated by the industrial controllers 118 to control aspects of the industrial systems, and/or smart control devices that may perform some aspect of the control system in conjunction with or independent of the controller. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Smart industrial devices may include motor drives, motor starters, power monitors, remote terminal units (RTUs), and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interface (HMI) terminals 114 that allow plant personnel to view telemetry and status data associated with the automation systems, and to control some aspects of system operation. HMI terminals 114 may communicate with one or more of the industrial controllers 118 or industrial devices 120 over a plant network 116, and exchange data with the industrial controllers or devices to facilitate visualization of information relating to the controlled industrial processes on one or more pre-developed operator interface screens.

HMI terminals 114 can be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMI terminals 114 can generate one or more display screens through which the operator interacts with the industrial controllers 118, and thereby with the controlled processes and/or systems. HMI terminals 114 can also be configured to interact directly with some industrial devices that allow direct control of the device from the HMI.

Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMI terminals 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian device 110 that aggregates and stores production information collected from the industrial controllers 118 or other data sources. Other systems may include inventory tracking system, work order management systems, repositories for machine or process drawings and documentation, vendor product documentation storage, vendor knowledgebases, internal knowledgebases, work scheduling applications, or other such systems, some or all of which may reside on the plant network 116 or an office network 108 of the industrial environment.

In many network topologies, connectivity between the office network 108 and the plant network 116 is managed by a network switch 115. The network switch 115 manages routing of information between the office and plant networks. The switch may also enforce policies, including but not limited to security and access policies. In some cases, the network switch 115 may also be used as a computing platform to host other applications used for processing data from the plant network 116 before being passed on to the office network 108.

In some system applications, a gateway device 119 may be used in addition to the network switch 115 for the purpose of processing and routing data from the plant network to a higher level system 126. The gateway device 119 may also be used as a computing platform to host other applications used for processing data from the plant network 116 before being passed on to the higher level system 126.

Higher level systems 126 may carry out functions that are less directly related to control of the industrial automation systems on the plant floor, but rather are directed to long term planning, high-level supervisory control, analytics, reporting, or other such functions. These system may reside on the office network 108 or at an external location relative to the plant facility, and may include, but are not limited to, cloud storage and analysis systems, big data analysis systems, manufacturing execution systems, data lakes, reporting systems, etc. In some scenarios, applications running in the higher level system 126 may be used for analysis of control system operational data, the results of which may be fed back to an operator at the control system, or directly to a controller 118 or device 120 in the control system.

Personnel interested in higher level operations may interact with the higher level system 126 using business level visualization interfaces 127. These interfaces may include, but are not limited to, business dashboards, remote monitoring and diagnostic displays, push notifications, chat-based interfaces and other mechanisms. The visualization interfaces may be executed on a variety of platforms including but not limited to desktop computers, tablets, and mobile devices such as smart phones.

The numerous industrial devices, machines, higher-level systems, and peripheral systems that make up an industrial enterprise can generate large amounts of data from many sources. Some sets of this data may be related despite originating from different sources; e.g., by virtue of their relevance to a common industrial process or a common aspect of plant operations. Still other sets of data may represent the same quantities duplicated at different sources, as when a telemetry device and a reporting application record values of the same performance parameter. Within a given industrial environment, there may be many correlations or causal relationships—both known and unknown to the owners of the industrial systems—between events, activities, and outcomes on the plant floor. However, since these related systems and data sources may record operational, statistic, and report data in different non-compatible formats, opportunities to collectively analyze these diverse data sets to gain greater insight into a plant's operations are lost.

To address these and other issues, one or more embodiments described herein provide a cloud-based data ingestion and analysis architecture that integrates and collects data from multiple diverse sources at one or more industrial facilities. Data sources can include plant-level industrial devices as well as higher-level business and reporting systems. Types of data collected by the system can include manufacturing floor data generated by industrial controllers, telemetry devices, sensors, motor drives, and other industrial assets; applications data; Industrial Internet of Things (IIOT) data; Enterprise Resource Planning (ERP) and other planning data; human interaction data obtained by monitoring users' interactions with control panels and HMIs, or by tracking the users' locations and behaviors; contextualized data; or other types of data. In some embodiments, the data can be integrated and collected from multiple sources at an on-premise edge or gateway device, which sends the data to event queues on the cloud platform. The data queues can orchestrate and store the data on cloud storage, and an analytics layer can perform business analytics or other types of analysis on the stored data to produce various outcomes.

In one or more embodiments, users can select from various analytical applications that provide insight into operations at any level of the enterprise. Example analytical applications can learn or predict manufacturing floor outcomes, operational outcomes, device and equipment outcomes (e.g., predictive maintenance, life cycle alerts, optimal device configurations, etc.), production outcomes (e.g., whether a current production rate will meet demand, which facility is best suited to carry out a production order, etc.), quality outcomes, performance outcomes, etc. Visualization tools can generate and deliver dashboards or other graphical interfaces to visualize results of the analyses.

Figure 2:
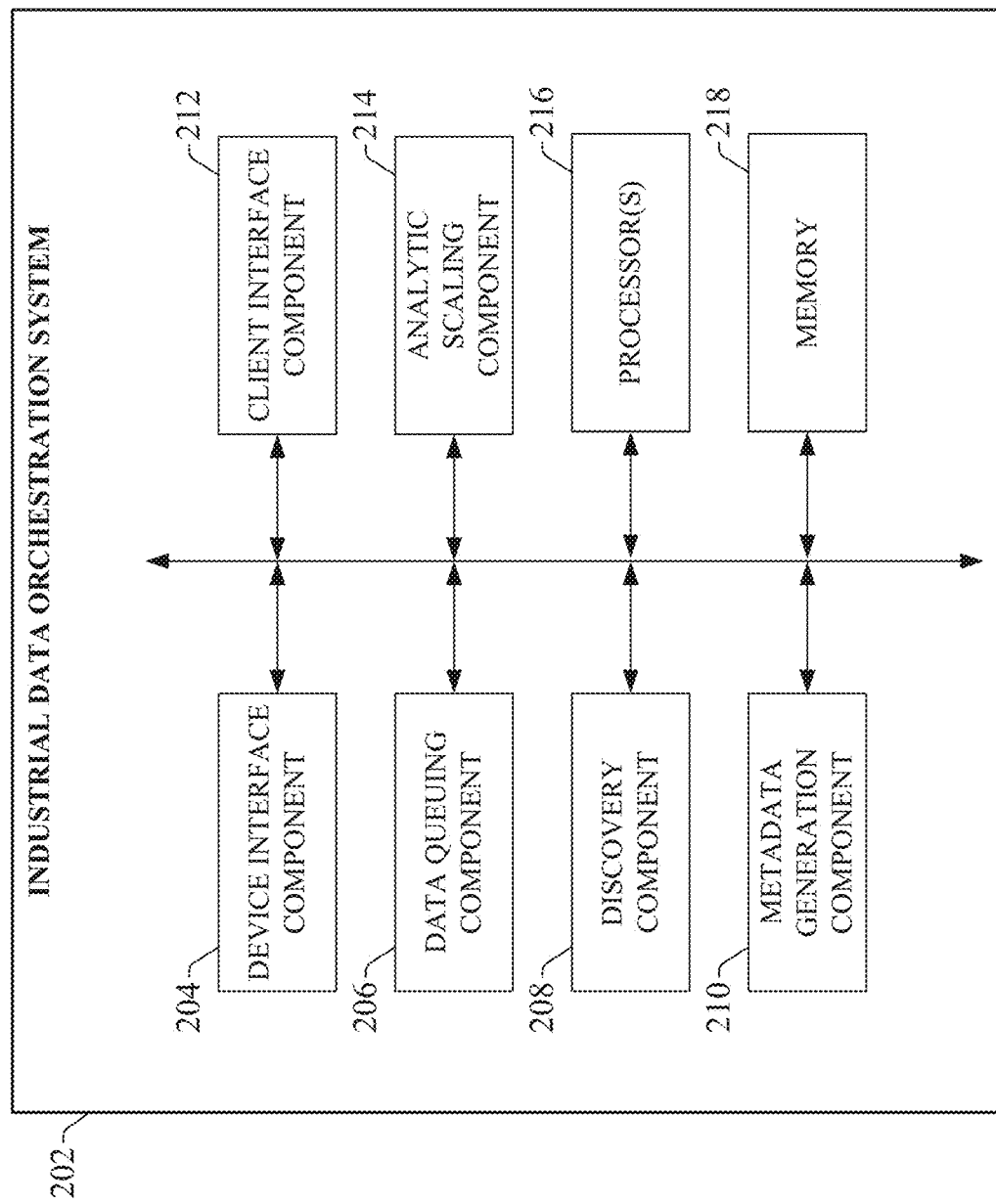
FIG. 2 is a block diagram of an example industrial data orchestration system.

FIG. 2 is a block diagram of an example industrial data orchestration system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial data orchestration system 202 can include a device interface component 204, a data queuing component 206, a discovery component 208, a metadata generation component 210, a client interface component 212, one or more processors 216, and memory 218. In various embodiments, one or more of the device interface component 204, data queuing component 206, discovery component 208, metadata generation component 210, client interface component 212, the one or more processors 216, and memory 218 can be electrically and/or communicatively coupled to one another to perform one or more of the functions of the industrial data orchestration system 202. In some embodiments, components 204, 206, 208, 210, 212, and 214 can comprise software instructions stored on memory 218 and executed by processor(s) 216. Industrial data orchestration system 202 may also interact with other hardware and/or software components not depicted in FIG. 2. For example, processor(s) 216 may interact with one or more external user interface devices, such as a keyboard, a mouse, a display monitor, a touchscreen, or other such interface devices.

The device interface component 204 can be configured to receive industrial data (e.g., configuration data, status data, process variable data, etc.) sent by a variety of disparate data sources. Data received and orchestrated by the industrial data orchestration system 202 can include manufacturing floor data, which may be received from industrial controllers, cloud-capable industrial devices, cloud gateway devices, or other sources of manufacturing floor data. The data can also include application data received from plant-level or business-level applications such as accounting or auditing applications, inventory tracking applications, ERP applications, MES applications, or other such systems. Data received by the device interface component 204 for orchestration can conform to a variety of different data formats, including but not limited to spreadsheet files, log files, database files, streaming data, etc.

Data queuing component 206 can be configured to maintain event queues that process the data received via device interface component 204. Data queueing component 206 can assign the received data to one or more event queues, and can also learn classifications for each data item contained in the files (e.g., a date/time indicator, a quantity indicator, a description, a machine name, etc.).

Discovery component 208 can be configured to identify relationships between data items among the different files placed in the event queues. Metadata generation component 210 can be configured to generate metadata identifying the relationships identified by the discovery component 208. In this way, learned relationships between the data items from the disparate data sources can be identified and recorded, and these relationships can be leveraged by the cloud-based analytics system in connection with performing a wide range of industrial analytics.

Client interface component 212 can be configured to exchange data with one or more client devices via a public and/or private network connection. For example, client interface component 414 can deliver information identifying assumed relationships between discovered data files or data items to an authorized client device, and receive from the client device confirmation input accepting the relationships, or user-specified relationship information between selected data files or items.

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
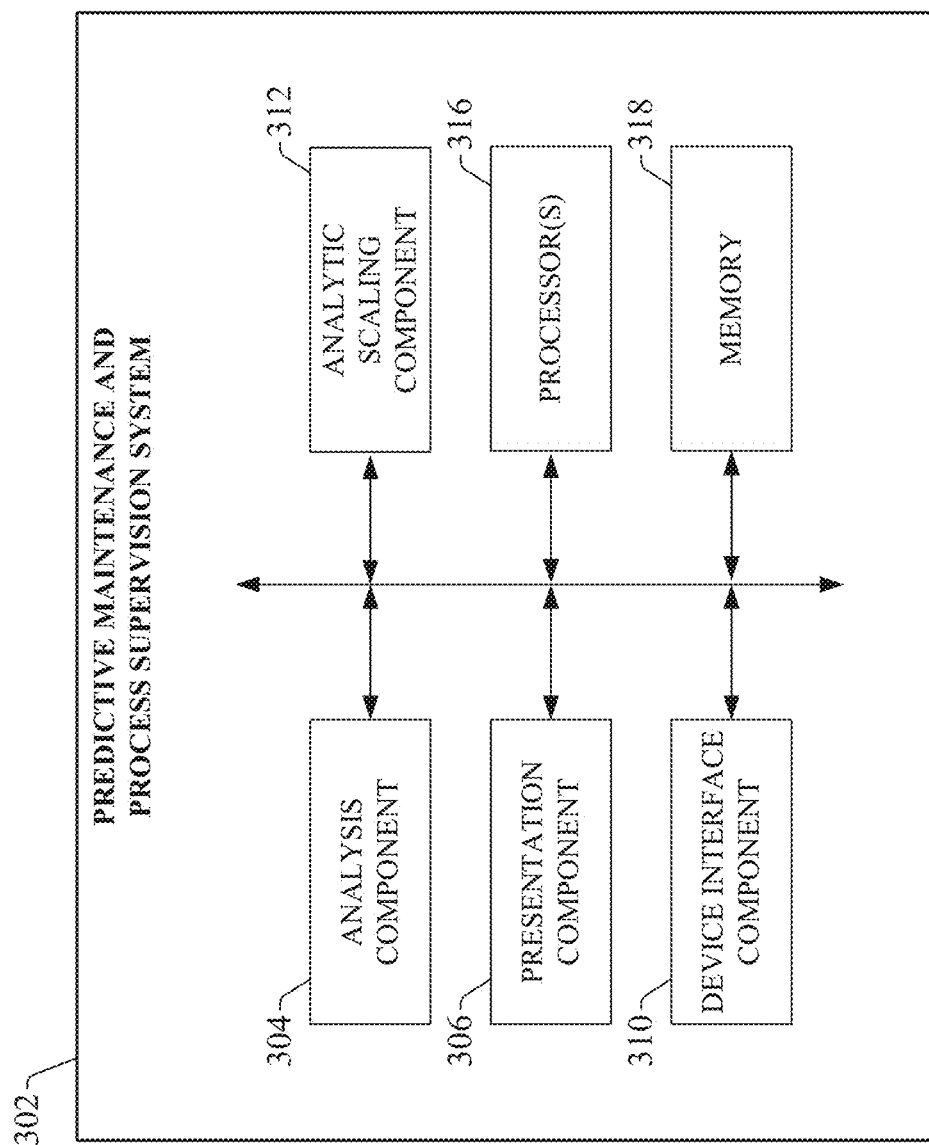
FIG. 3 is a block diagram of an example predictive maintenance and process supervision system.

FIG. 3 is a block diagram of an example predictive maintenance and process supervision system 302 according to one or more embodiments of this disclosure. Predictive maintenance and process supervision system 302 can include an analysis component 304, a presentation component 306, a device interface component 310, an analytic scaling component 312, one or more processors 316, and memory 318. In various embodiments, one or more of the analysis component 304, presentation component 306, client interface component 308, device interface component 310, analytic scaling component 312, the one or more processors 316, and memory 318 can be electrically and/or communicatively coupled to one another to perform one or more of the functions of the predictive maintenance and process supervision system 302. In some embodiments, components 304, 306, 310, and 312 can comprise software instructions stored on memory 318 and executed by processor(s) 316. Predictive maintenance and process supervision system 302 may also interact with other hardware and/or software components not depicted in FIG. 3. For example, processor(s) 316 may interact with one or more external user interface devices, such as a keyboard, a mouse, a display monitor, a touchscreen, or other such interface devices. In various embodiments, predictive maintenance and process supervision system 302 can execute as a cloud-based system, or can be implemented on a plant-level device (e.g., as a standalone analytic device, or as an integrated subsystem of an industrial device or a cloud gateway (edge) device).

The predictive maintenance and process supervision system 302 can work in conjunction with the industrial data orchestration system 202 to perform industry-specific analytics on the stored data and metadata based in part on the relationships between data items discovered by the orchestration system. The analysis component 304 can be configured to analyze the data and associated metadata for predictive maintenance opportunities, or to supplement plant-level control with higher-level process supervision, as will be described in more detail herein. Presentation component 306 can be configured to render results of the analysis on a client device in a suitable format, including but not limited to graphical dashboards or report presentations.

Device interface component 310 can be configured to send instruction data to a target control device (e.g., an industrial controller, motor drive, etc.) to modify a control parameter or control routine on the control device based on results generated by analysis component 304. Analytic scaling component 312 can be configured to shift at least a portion of analytic processing or an analytic result to another analytic system hosted on another device or residing on a different level of an industrial enterprise based on a determination of a relevance of the processing or result to a portion of the industrial enterprise serviced by the other analytic system.

The one or more processors 316 can perform one or more of the functions described herein with reference to the systems and/or methods disclosed. Memory 318 can be a computer-readable storage medium storing computer-executable instructions and/or information for performing the functions described herein with reference to the systems and/or methods disclosed.

Figure 4:
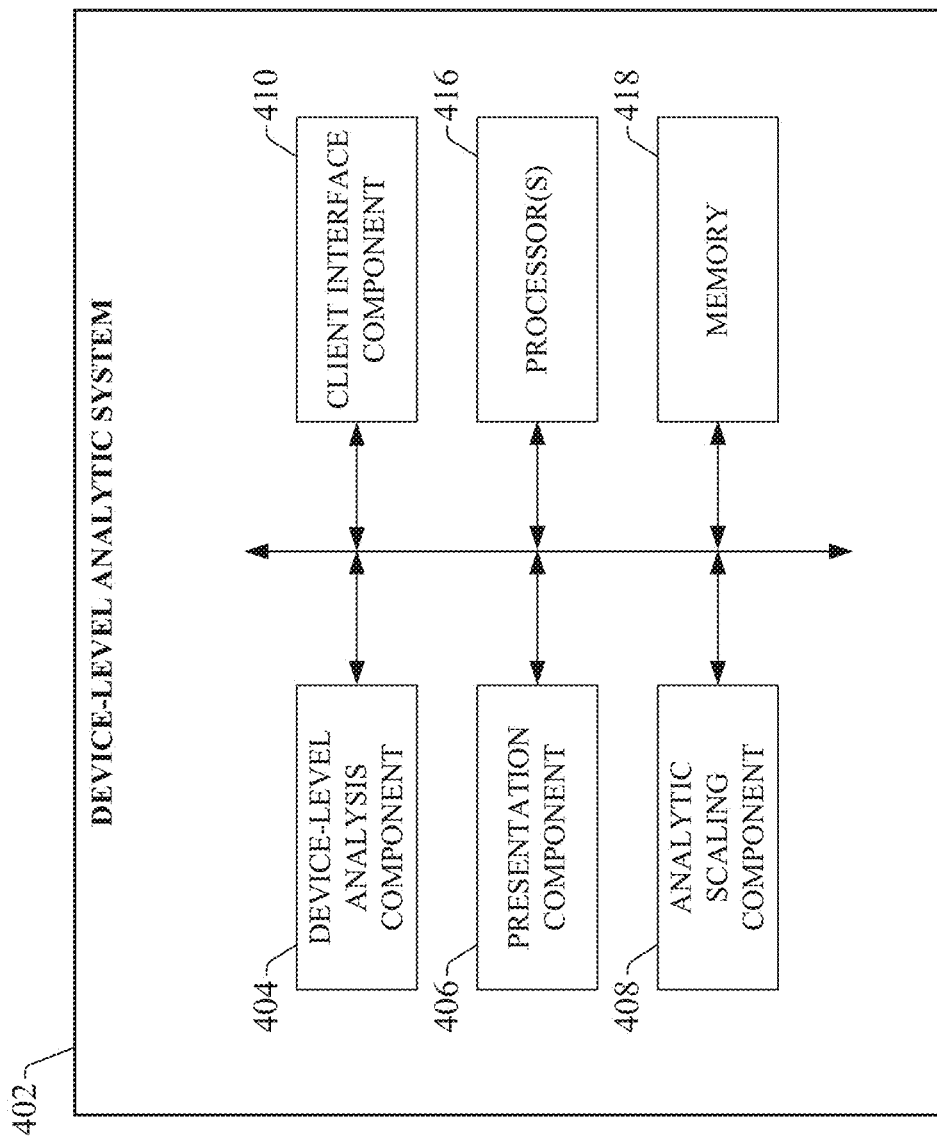
FIG. 4 is a block diagram of an example device-level analytic system.

FIG. 4 is a block diagram of an example device-level analytic system 402 according to one or more embodiments of this disclosure. Device-level analytic system 402 can include a device-level analysis component 404, a presentation component 406, an analytic scaling component 408, a client interface component 410, one or more processors 416, and memory 418. In various embodiments, one or more of the device-level analysis component 404, presentation component 406, analytic scaling component 408, client interface component 410, the one or more processors 416, and memory 418 can be electrically and/or communicatively coupled to one another to perform one or more of the functions of the device-level analytic system 402. In some embodiments, components 404, 406, 408, and 410 can comprise software instructions stored on memory 418 and executed by processor(s) 416. Device-level analytic system 402 may also interact with other hardware and/or software components not depicted in FIG. 4. For example, processor(s) 416 may interact with one or more external user interface devices, such as a keyboard, a mouse, a display monitor, a touchscreen, or other such interface devices. In various embodiments, device-level analytic system 402 can execute on a plant-level device (e.g., as a standalone analytic device, or as an integrated subsystem of an industrial device or a cloud gateway (edge) device).

The device-level analysis component 404 can be configured to perform device-level analytics on industrial data or business data within the scope of a device on which the device-level analytic system 402 executes. For example, if device-level analytic system 402 executes on a motor drive, the device-level analytic system 402 may be configured to perform local analytics on data received or generated by the motor drive in connection with assessing the health of the motor drive, a status or health of a motor-driven application controlled by the drive, or other such analytics. Presentation component 406 can be configured to render results of the device-level analytics on a client device in a suitable format, including but not limited to graphical dashboards or report presentations.

Analytic scaling component 408 can be configured to exchange data with one or more other device-level analytic systems or with higher-level analytic systems (e.g., cloud-based analytic systems, such as predictive maintenance and process supervision system 302) in connection with performing collaborative analysis. For example, analytic scaling component 408 can, when appropriate, send results of local analytics performed by the device-level analysis component 404 to a cloud-based analytic system (e.g., predictive maintenance and process supervision system 302) for enterprise-level analysis. The analytic scaling component 408 can also send selected analysis results to another analytic system on the same level or a different level of an industrial enterprise (e.g., a device level, a plant level, a business level, an enterprise level, etc.), where the results can be used for further analytics at that other system. The client interface component 410 can be configured to exchange data with one or more client devices via a public and/or private network connection.

The one or more processors 416 can perform one or more of the functions described herein with reference to the systems and/or methods disclosed. Memory 418 can be a computer-readable storage medium storing computer-executable instructions and/or information for performing the functions described herein with reference to the systems and/or methods disclosed.

Figure 5:
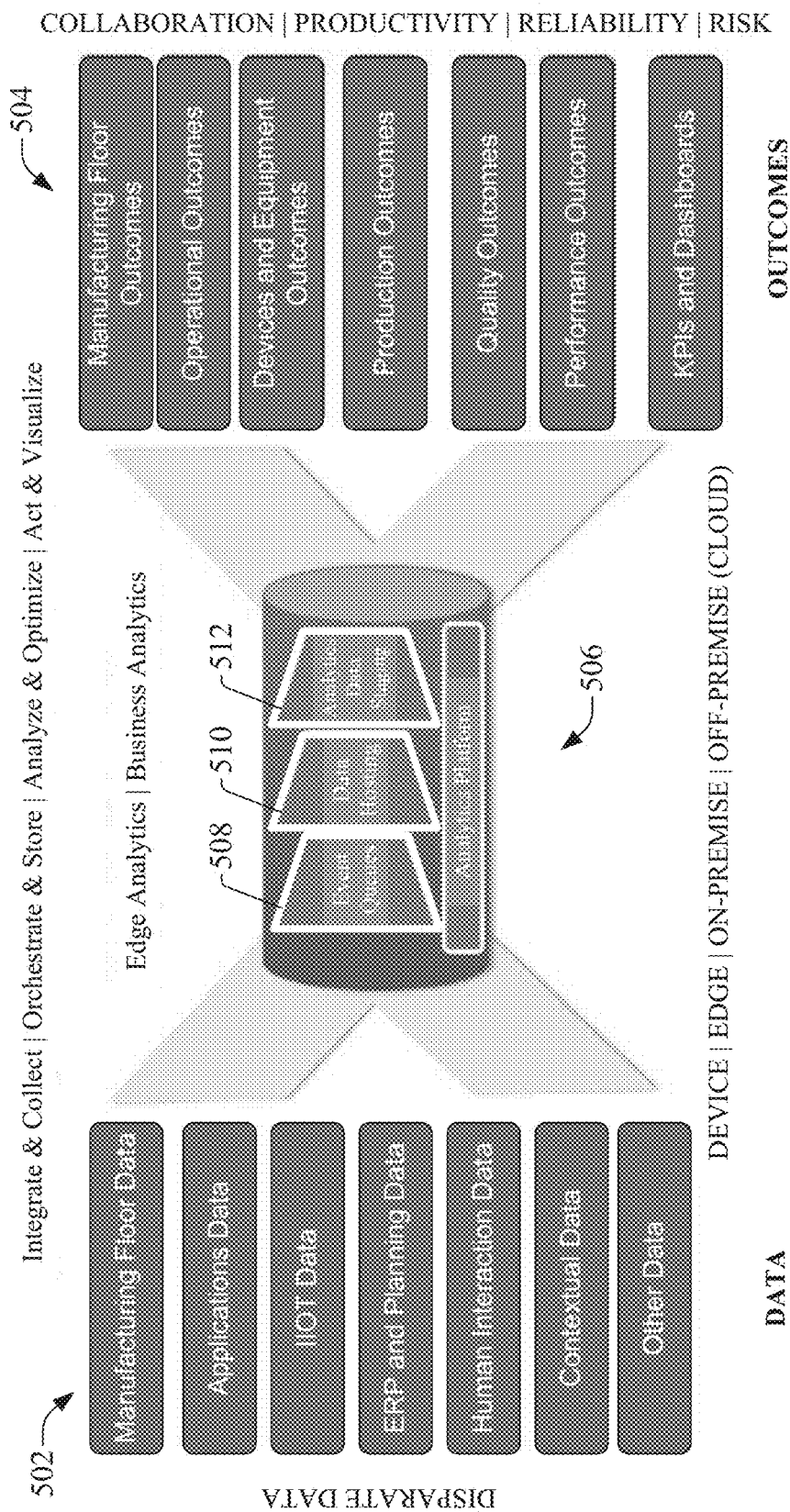
FIG. 5 is a generalized diagram illustrating an example industrial analytics platform.

FIG. 5 is a generalized diagram illustrating an example industrial analytics platform 506 according to one or more embodiments. In various embodiments, analytics platform 506 can be implemented on an on-premise device (e.g., an industrial device or edge device) to carry out device-level analytics (see FIG. 7), or on a cloud platform to carry out higher-level analytics (see FIG. 8). The industrial analytics platform 506 is configured to collect data 502 from multiple different data sources, where the data 502 includes data files of multiple different formats. Data 502 collected by the industrial analytics platform 506 can include, but is not limited to, manufacturing floor data, applications data, IIOT data, ERP and planning data, human interaction data (where such human interaction data may be obtained by tracking operator locations using tracking devices, inferring human interactions with industrial systems based on monitored control panel operations or human-machine interface interactions, or through other techniques), contextual data applied to items of industrial data (e.g., time/date stamps indicating a time that the data was generated, location data identifying a location of origin of the data, etc.), or other such data.

Sources of data 502 can include plant-level industrial devices (e.g., industrial controllers, motor drives, sensors, telemetry devices, power monitor devices, human-machine interface terminals, vision systems, quality check systems, lot traceability systems, etc.), higher level business systems (e.g., accounting applications, ERP or MES systems, auditing applications, etc.) or other on-premise data sources (e.g., maintenance schedules, operator work schedules, product inventory databases, data historians, etc.). Ingestion of the data 502 can be managed by the industrial data orchestration system 202 described above. In one or more embodiments, the data is sent to event queues 508 on the cloud-based or on-premise analytics platform 506 (e.g., by the data queueing component 206). The event queues 508 orchestrate and store the data 502 on cloud storage, and an analytics layer performs business analytics or other types of analysis on the stored data to produce various outcomes 504. As will be described in more detail below, the industrial data orchestration system 202 can identify relationships between items of the data 502, and record these relationships as metadata to facilitate analytics and machine learning. Data hosting services 510 on the cloud platform can store the collected and contextualized data, and analytics data staging services 512 (e.g., implemented by the predictive maintenance and process supervision system 302) can perform analytics on the stored data and metadata.

Users can select from various analytical applications that provide insight into operations at any level of the enterprise based on analysis of the collected and contextualized data and metadata. Analysis of the collected and contextualized data can be carried out, for example, by the predictive maintenance and process supervision system 302 described above. Example analytical applications can learn or predict manufacturing floor outcomes, operational outcomes, device and equipment outcomes (e.g., predictive maintenance, life cycle alerts, optimal device configurations, etc.), production outcomes (e.g., whether a current production rate will meet demand, which facility is best suited to carry out a production order, etc.), quality outcomes, performance outcomes, etc. The analytics platform 506 can generate and deliver dashboards or other graphical interfaces to authorized client devices to visualize results of the analyses.

Figure 6:
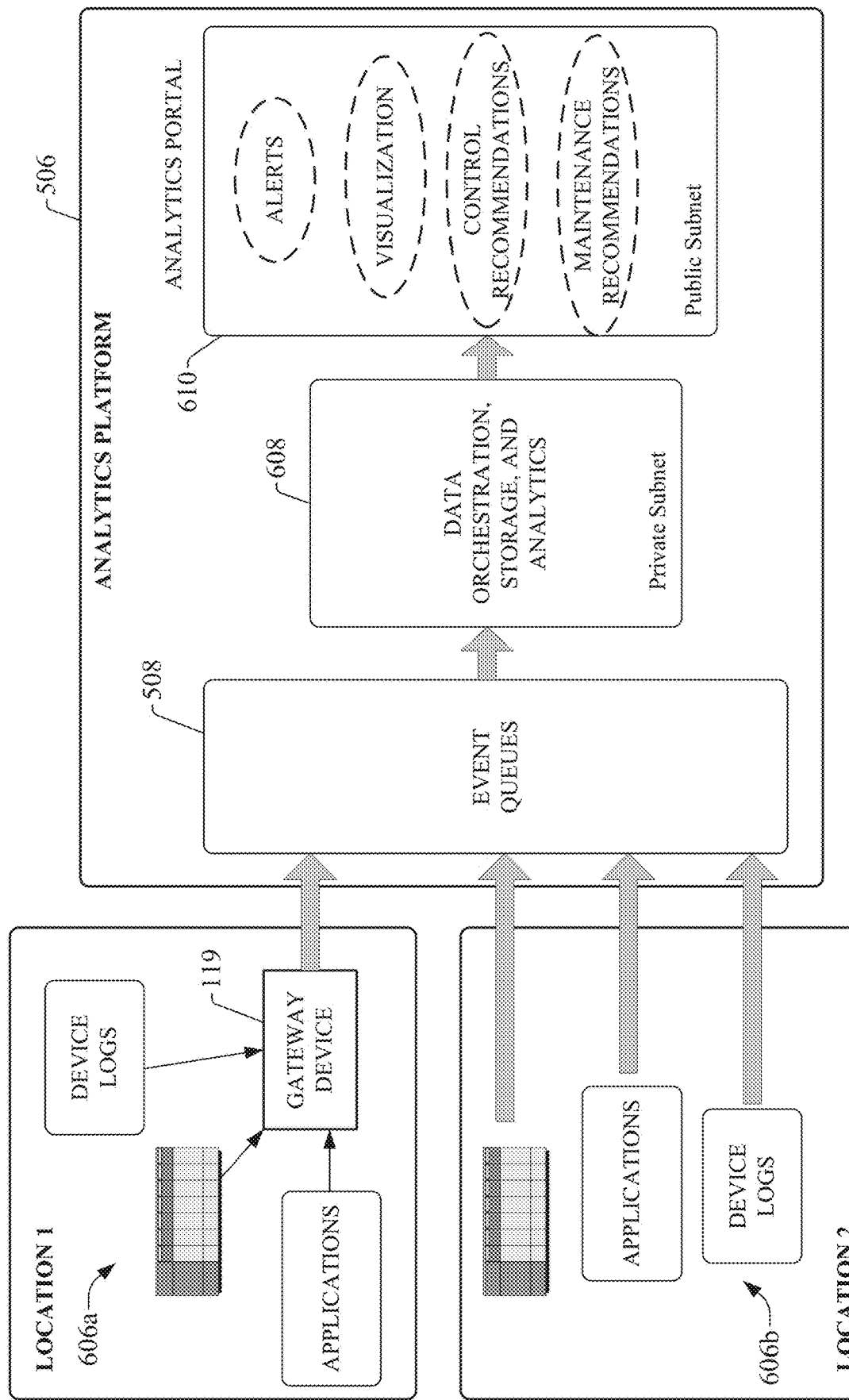
FIG. 6 is a diagram illustrating ingestion of data from two sets of data sources.

Some sources of data 502 may have integrated cloud connectivity functionality, while others may require the use of a cloud gateway device 119 to migrated data items or data files to the analytics platform 506. FIG. 6 is a diagram illustrating ingestion of data from two sets of data sources 606a and 606b. In the illustrated example, a cloud gateway device 119 collects data from one or more data sources 606a (e.g., industrial devices, device logs, applications, etc.) at Location 1. Cloud gateway device 119 is configured to exchange data with the cloud-based analytics platform 506 via one or more wired or wireless networks (which can comprise both private networks—such as local office network 108 or plant network 116—and public networks such as the interna). Accordingly, cloud gateway device 119 can send data collected from data sources 606a to the event queues 508 of analytics platform 506 for orchestration, storage, and analytics. By contrast, data sources 606b at Location 2 are cloud-capable devices configured to establish communication channels to the analytics platform 506 and send their local data to the event queues 508 without the use of a gateway device 119.

In the example architecture depicted in FIG. 6, data management functions such as data orchestration, analytics, and storage can be carried out on a private subnet managed by an owner of the analytics system, while analytic results can be sent to client devices via a public subnet 610. Such results can include alerts, real-time or historical data visualization, recommended modifications to a control process (e.g., setpoint or process variable recommendations, production schedule recommendations, recommendations to replace an identified line operator at a specified time, etc.), maintenance recommendations (e.g., recommendations to replace or reconfigure a specified industrial device, recommended maintenance schedules for a specified machine, etc.).

Figure 7:
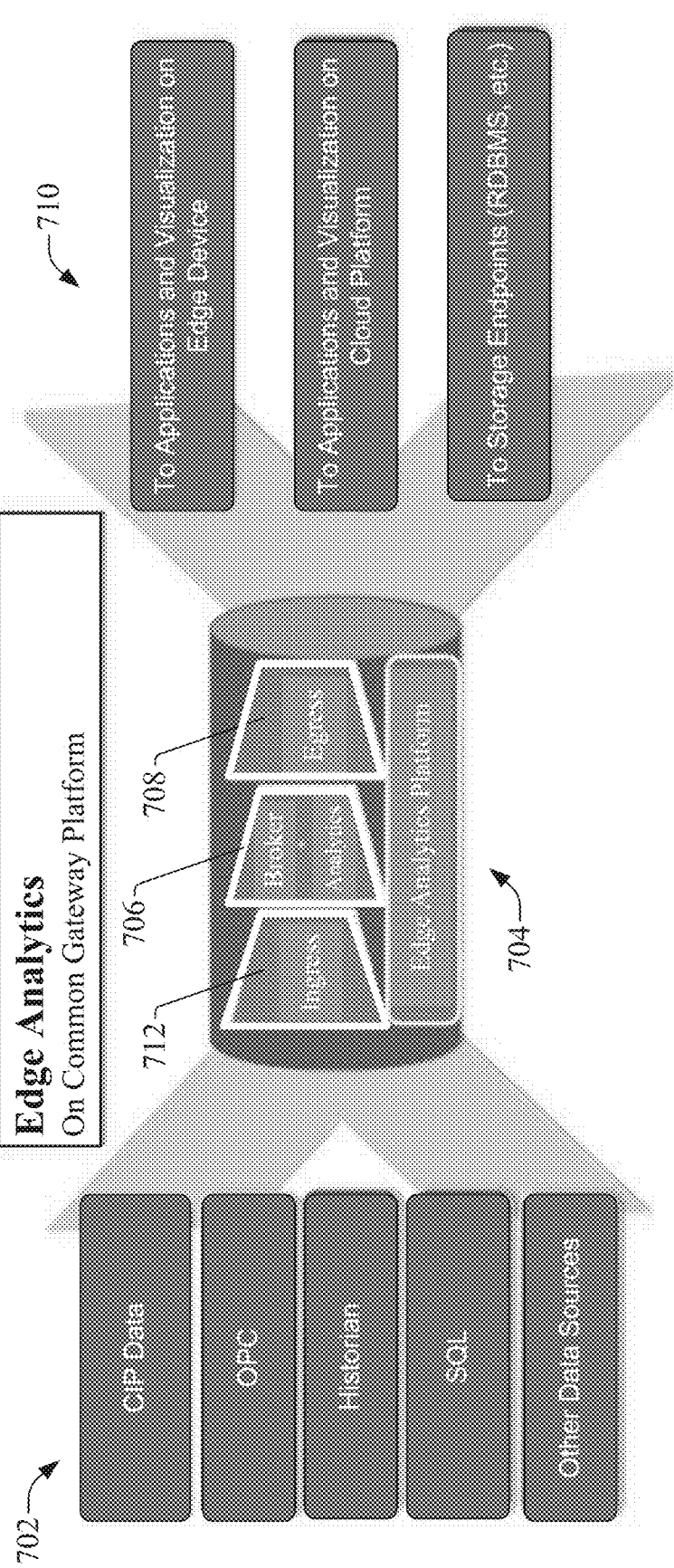
FIG. 7 is a diagram illustrating a general architecture for a device-level analytics platform implemented on an edge device.

In addition to cloud-level analytics, the scalable analytics architecture described herein can also include analytics capabilities at the device-level, and the architecture can scale analytic data and functionality from the device-level to higher-level analytic systems, or from the higher-level analytic systems down to the device-level. Device-level analytics can be implemented on the industrial devices themselves as well as on cloud gateway devices (e.g., cloud gateway device 119), also referred to as edge devices. FIG. 7 is a diagram illustrating a general architecture for a device-level analytics platform implemented on an edge device. In this example, the analytics platform 704 is implemented on an edge or gateway device located at the plant facility (e.g., gateway device 119 or another type of edge device). Analytics platform 704 can be implemented, for example, by device-level analytic system 402. Data 702 is received by the edge device from multiple data sources communicatively connected to the edge device. Data 702 received by the edge device can include, but is not limited to, common industrial protocol (CIP) data or industrial data conforming to another industrial protocol, OLE for Process Control (OPC) data, historian data, structured query language (SQL) data, or data from other device-level or application-level sources.

Ingress services 712 executing on the edge device analytics platform 704 can receive the disparate data, and a broker and analytics service 706 executing on the platform 704 can perform orchestration and analytics on the data 702 (to be described in more detail herein). Egress services 708 executed on the platform 704 can send results 710 of the analytics to one or more suitable destination devices or systems depending on the application. For example, results 710 of the edge-level analytics can be sent to a visualization application or another type of application executing on the edge device itself or on a client device having communicative access to the edge device. Analytic results 710 can also be sent to visualization applications or other types of applications on a cloud platform. This can include sending analytic results to the predictive maintenance and process supervision system 302 residing on the cloud platform for higher-level (e.g., enterprise-level) analytics. In some embodiments, the decision to send analytic results (or a subset of data 702) to analytic applications executing on the cloud platform can be made by analytic scaling component 408 of device-level analytic system 402. In yet another scenario, analytic results 710 can be sent to storage endpoints, such as relational database management systems (RDBMS), data historians, or other storage systems.

Figure 8:
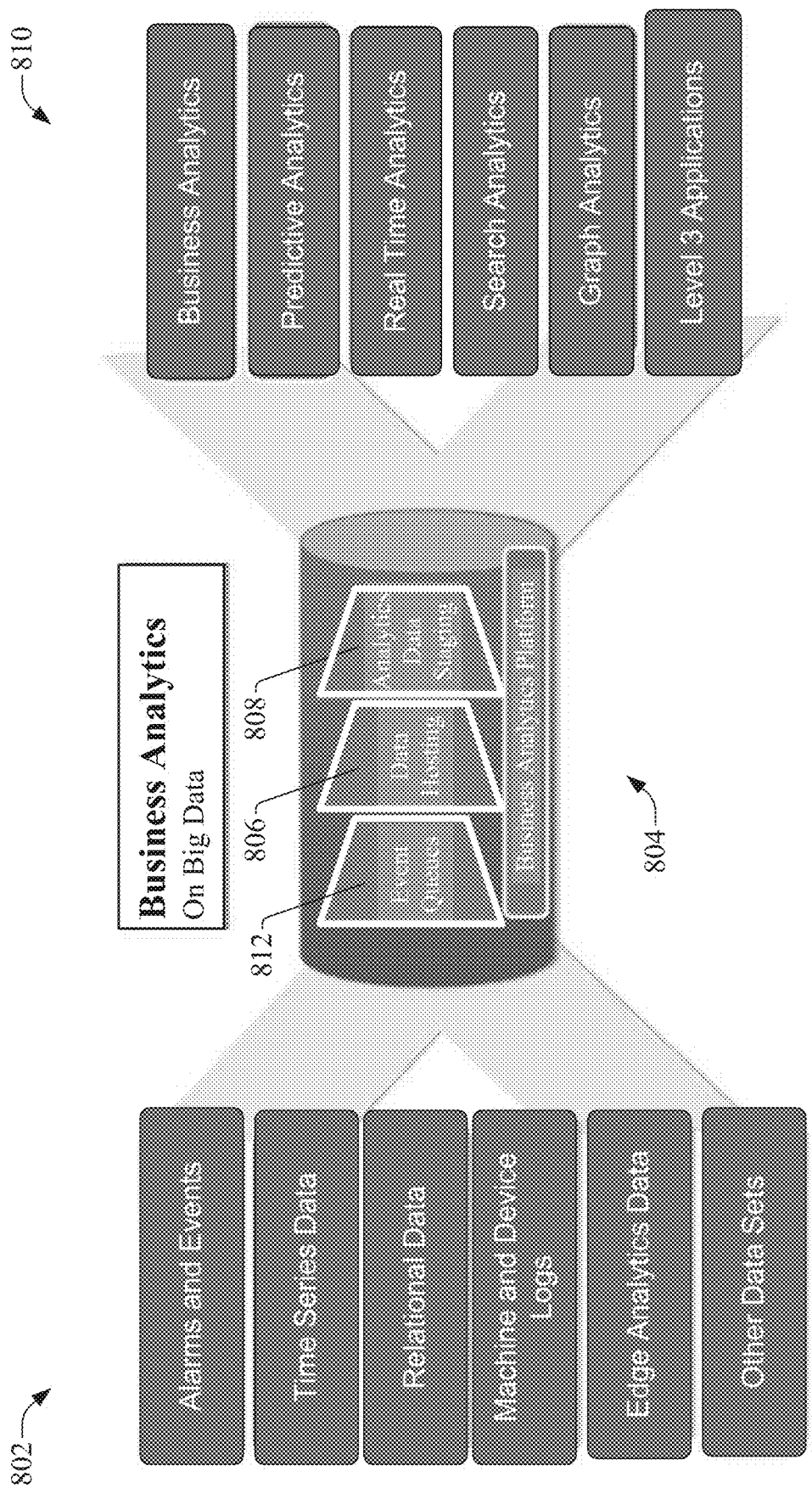
FIG. 8 is a diagram illustrating a general architecture for a business-level analytics platform.

FIG. 8 is a diagram illustrating a general architecture for a business-level analytics platform 804, which may be implemented on a cloud platform or on a business-level device (e.g., a server located at the plant facility and communicatively connected to a number of data sources, including device-level analytics systems implementing device-level analytics platform 704). Similar to the device-level analytics platform 704 described above, business-level analytics platform 804 can receive data 802 conforming to multiple different data formats and types, and carry out defined analytics on the data 802. However, the data 802 received and processed by the business-level analytics platform 804 is not limited to data scoped to a single device, but rather is received from multiple diverse devices and sources across one or more industrial facilities. This data can include alarm and event data and time series data received from multiple industrial devices or systems, relational data from one or more databases, machine and device log files, result data generated by device-level analytics (e.g., edge analytics) received from one or more device-level analytic platforms 704, or other such data sets. As described above in connection with FIG. 5, the data 802 can be received in event queues 812 maintained by the analytics platform 804, and data hosting services 806 on the analytics platform 804 can store the collected and contextualized data. Analytics data staging services 808 (e.g., implemented by the predictive maintenance and process supervision system 302) can perform analytics on the stored data and metadata.

Example analytic outputs 810 that can be generated by the business-level analytics platform 804 can include, but are not limited to, results of business analytics, predictive analytics, real-time analytics, search analytics, graph analytics, or other such analytic applications.

Figure 9:
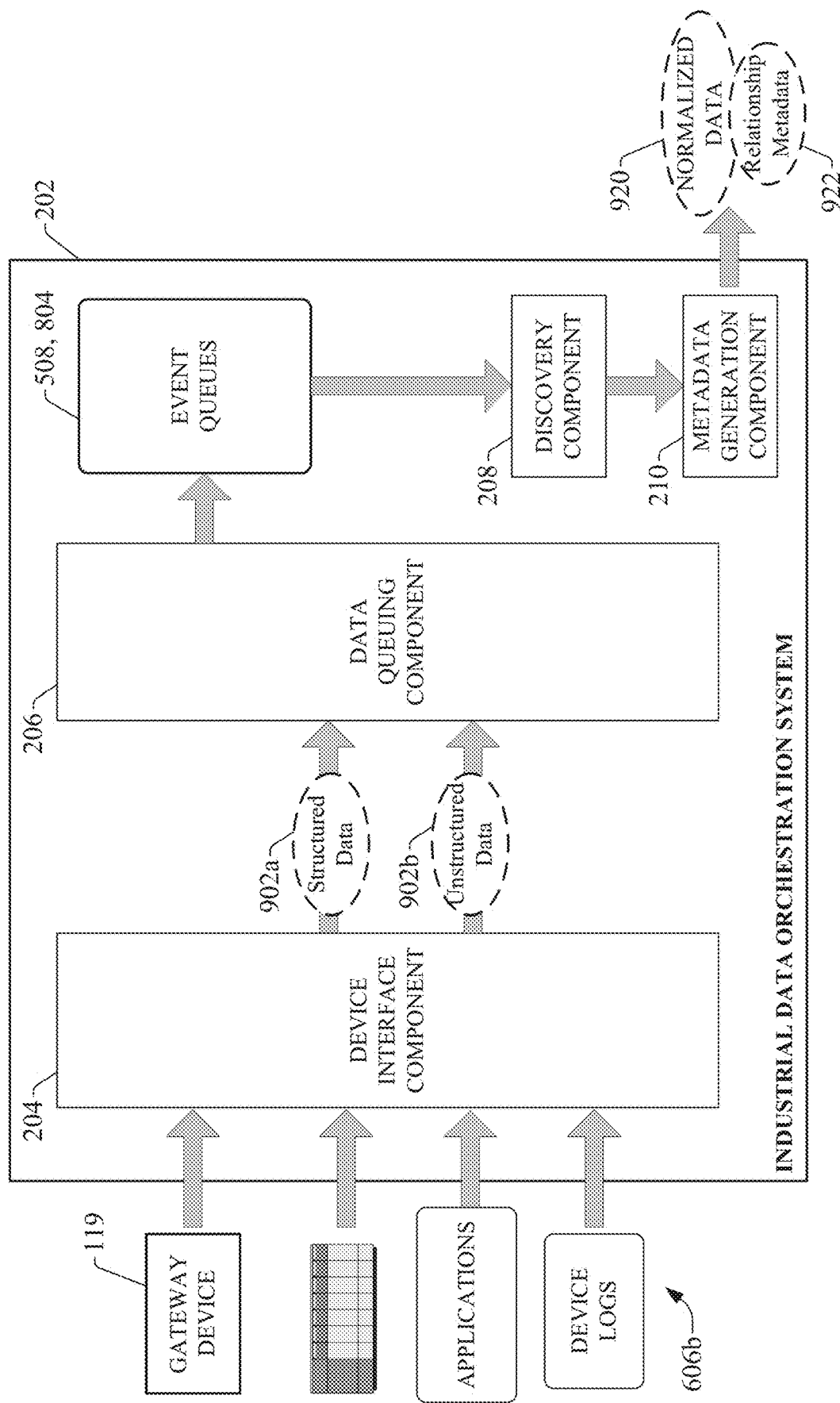
FIG. 9 is a diagram of an industrial data orchestration system illustrating a generalized data flow for processing data from disparate sources to yield normalized data and associated data relationships.

FIG. 9 is a diagram of industrial data orchestration system 202 illustrating a generalized data flow for processing data from disparate sources to yield normalized data and associated data relationships. As a prerequisite to performing collective analytics at the device-level, business-level, or another level of an industrial enterprise (e.g., by analytics platforms 704 or 804), industrial data orchestration system 202 can normalize heterogeneous data (e.g., data 502, 702, or 802) collected or received from multiple sources at one or more facilities into a common format. To this end, device interface component 204 can receive or collect this diverse data as structured data 902a and/or unstructured data 902b, either from a gateway device 119 that aggregates data from multiple industrial devices, systems, or applications, or directly from the industrial devices or systems themselves (e.g., devices 606b). Example data file types that can be received and processed by the data queuing component 206 can include, but are not limited to, spreadsheet files, log files, database files, image data from a camera or optical scanner, energy matrix data, streamed data from power monitors, or other types of data files. Data queuing component 206 can place this structured and unstructured data in event queues 508 or 804. In some embodiments, a single security layer can be used to provide security to this data collection process.

Once the data is placed in the data queues, discovery component 208 can analyze the structure of each received data file or data item to identify the file format of each data file or item, and convert each data file or item to a common format based in part on the original file type, thereby normalizing the diverse data to a common format. Discovery component 208 can also analyze each data file to learn and assign classifications for data items contained in each data file. For example, based on data field headings or other metadata associated with a given data item, discovery component 208 can identify a date or time indication associated with the data item, a quality indicator for the data item, a name or description of the data item, a machine name or production line from which the data item originated, etc. Based in part on these classifications and other inferred information, discovery component 208 can identify relationships between the stored normalized data, and metadata generation component 210 can record these discovered relationships as relationship metadata 922, which is stored together in association with the normalized data 920. The analytics architectures described herein can include data ingestion or event queues (e.g., event queues 508 or 804) that collect or receive data files of different types from diverse sources distributed throughout the plant facilities.

In some embodiments, data queuing component 206 can also add contextual metadata to the data files or data items, which in addition to the relationship metadata 922 can record additional context regarding the source of the data items or the conditions under which the data items were generated. For example, for respective sets of the structured and unstructured data 902a, 902b, data queuing comment 206 can add one or more of an identity of a device that generated the data (e.g., a specific industrial controller, motor drive, meter, etc.); an identify of a plant facility and/or a production line or production area within the facility from which the data was received; a timestamp indicating a time that the data was received or generated, a work shift during which the data was generated; an identity of an operator responsible for operation of a machine at a time that data relating to that machine was received or generated; or other such contextual information. This contextual metadata can be leveraged by the discovery component 208 in connection with learning relationships between the collected data items, as well as by analysis components 304, 404 during subsequent analysis of the normalized data.

Figure 10:
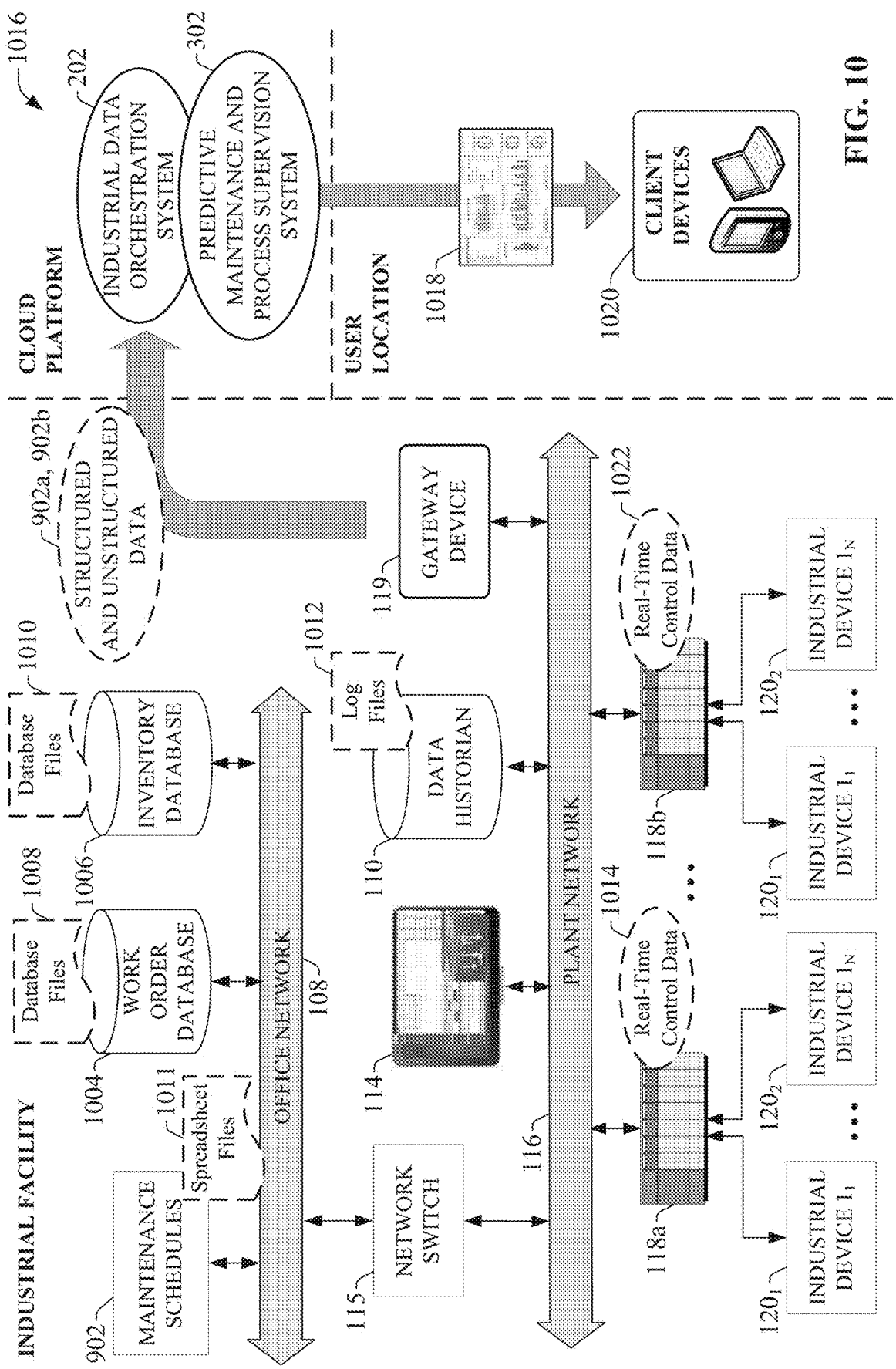
FIG. 10 is a diagram of an example industrial architecture in which a gateway device feeds both structured and unstructured data from disparate data sources throughout an industrial enterprise to a cloud-based analytic system executing on a cloud platform.

FIG. 10 is a diagram of an example industrial architecture in which a gateway device 119 feeds both structured and unstructured data 902a, 902b from disparate data sources throughout an industrial enterprise to a cloud-based analytic system 1016 executing on a cloud platform. Although FIG. 10 depicts an architecture in which a gateway device 119 gathers data items and data files from local data sources within the industrial facility and sends the data to the cloud platform (as in the architecture of Location 1 depicted in FIG. 6), individual industrial devices or applications with integrated cloud capability (e.g., IIOT devices) can also be configured to send their data files directly to the cloud-based analytic system 1016 without the need for a gateway device 119.

Cloud-based analytic system 1016 can include the industrial data orchestration system 202, which normalizes the disparate structured and unstructured data 902a, 902b and discovers relationships between the data, and the predictive maintenance and process supervision system 302, which generates outcomes based on analysis of the normalized data and the discovered relationships. Data gathered by the gateway device 119 (or edge device), can include both data from both plant floor devices as well as from business-level systems (e.g., accounting systems, inventory tracking systems, ERP and MES systems, etc.). In the illustrated example, data sent to the gateway device 119 for ingestion by the cloud-based analytic system 1016 includes real-time control data 1014 and 1022 generated by industrial controllers 118a and 118b. This real-time control data can include, for example, analog and digital data stored in the controllers' data tables or associated with the controllers' data tags. The control data can represent, for example, measured telemetry or sensor values read from a controlled industrial process (e.g., temperatures, pressures, flows, levels, speeds, etc.), measured digital values (e.g., part present sensor values, safety device statuses, switch settings, etc.), controlled analog and digital output values generated by the controllers 118 and directed to industrial output devices of the controlled system, calculated performance metrics, etc.

Other data collected by the gateway device 119 can include, but is not limited to, log files 1012 from a data historian device 110 residing on the plant network 116, spreadsheet files 1011 stored on a maintenance schedule server 902 (residing on office network 108) and containing information regarding maintenance schedules for various machines throughout the industrial facility, database files 1008 stored on a work order database 1004 and containing work order information relating to products produced at the industrial facility, database files 1010 stored on an inventory database 1006 and containing information regarding current and/or expected product availability, or other such data files. Although the present example presumes specific types of information contained in these respective data file types— e.g., maintenance schedule information stored as spreadsheet files 1011, work order information stored in database files 1008, etc.—it is to be appreciated that these information types are only intended to be exemplary, and that other types of information can be stored in the various file types. These diverse sets of data are collected by gateway device 119, and sent to the cloud-based analytic system 1016 residing on the cloud platform as structured and unstructured data 902a, 902b.

Figure 11:
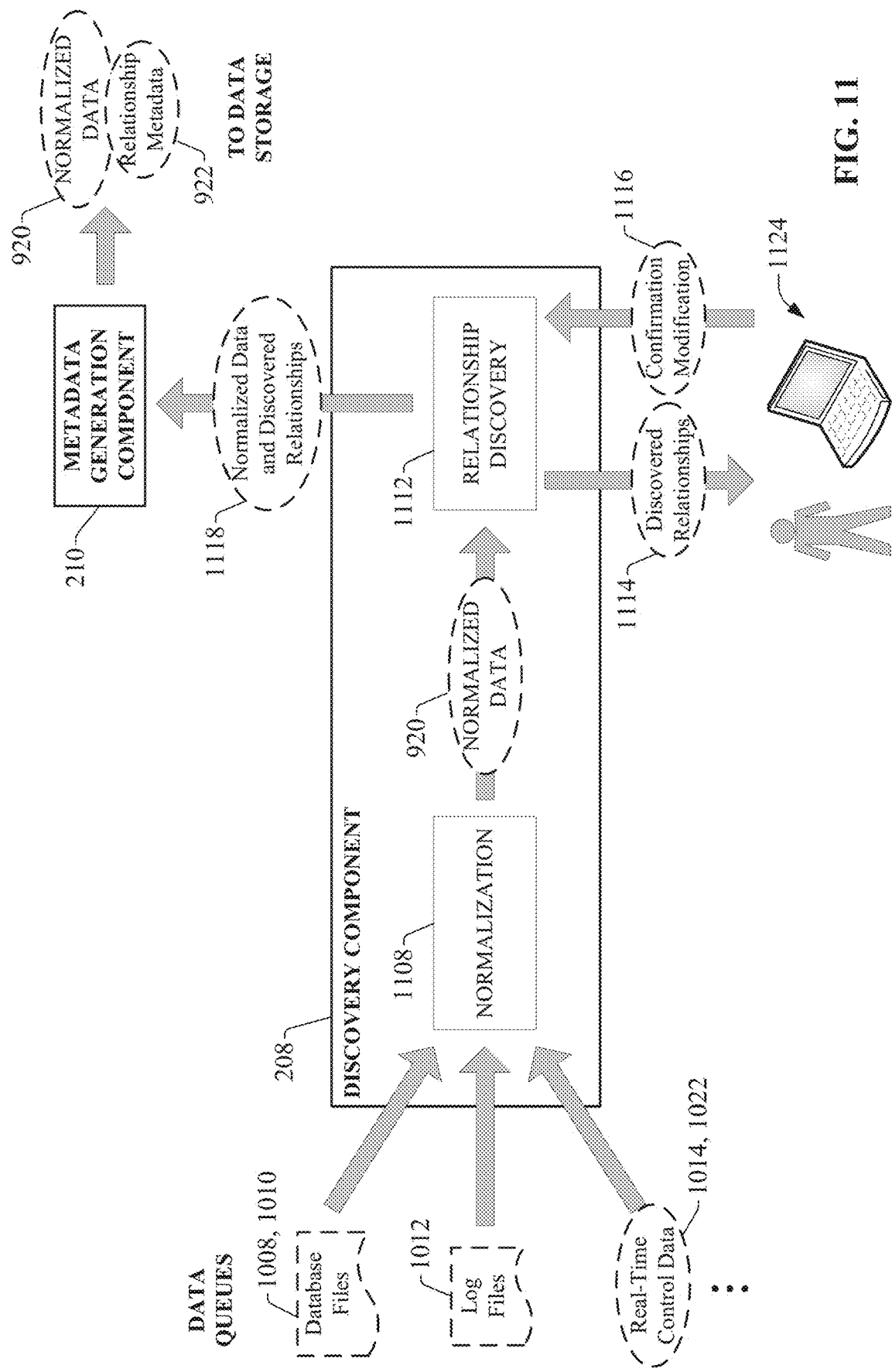
FIG. 11 is a diagram illustrating normalization of the diverse structured and unstructured data sets and generation of relationship metadata by components of the industrial data orchestration system.

FIG. 11 is a diagram illustrating normalization of the diverse structured and unstructured data sets and generation of relationship metadata 922 by components of the industrial data orchestration system 202. Although the following example is described in terms of data orchestration at the cloud level, similar techniques can be used by device-level analytic systems to normalize and orchestrate diverse sets of data on the plant floor level. At the cloud platform, the data files (or streaming data) collected by the gateway device 119 are received from the gateway device 119 by device interface component 204 and placed in one or more event queues by data queuing component 206 (see FIGS. 2 and 9). A normalization block 1108 of discovery component 208 then analyzes the respective data files to identify the formats of each file (e.g., database file, log file, power monitor file, streaming data, binary data, industrial controller data, etc.), and converts each file to a common format based on the identified file type to yield normalized data 920. This normalized data 920 comprises the content of the data files—including the values of the data items contained in the files as well as metadata identifying the names of data fields within which the data items are located, such as spreadsheet column headings, database field names, etc.—normalized to a common format that allows collective analysis of the data items contained in the files.

A relationship discovery block 1112 of discovery component 208 looks for relationships between the data items contained in the normalized data 920. The discovery component 208 can discover relationships based on the learned classifications of the respective data items as well as the content of the data items. For example, either the data queuing component 206 or the discovery component 208 can identify common or similar machine names, product line names, or other such signifiers across different data files. These signifiers can be identified, for example, within content of a data field (e.g., a value of a data item itself) or as a header of a data field contained in the normalized data 920. Discovery of common or similar machine names, product model numbers, employee names, production areas, etc. within different data files can be indicative of a relationship between different data sets contained in different data files represented by normalized data 920, and these data sets can be flagged accordingly by discovery component 208.

Common signifiers within different data files can also be indicative of instances of the same data contained within different data files or data sets. For example, a certain performance metric may be measured and generated by two different telemetry devices, or may be measured directly by a telemetry device as well as being calculated indirectly by a higher-level business system, thereby yielding two sets of data representing the same performance metric over the same time period. In such instances, discovery component 208 can infer that these two data sets represent the same metric based on a similarity between the values (e.g., an observation that the values are equal or are within a defined tolerance of one another signifying that the data sets represent the same metric). Based on this inference, discovery component 208 can flag the two data sets as being alternate sources of the same information, and may apply metadata or other characteristics of one of the data sets to the other data set if appropriate (e.g., by assigning a name or identifier of one of the data sets to the other data set if the other data set does not already have an assigned name or identifier).

In some embodiments, discovery component 208 can be configured to discover relationships between data sets in different data files based on common or similar signifiers even if different names are used as the signifier in the respective data files. In such instances, discovery component 208 may infer that two sets of data are associated with the same machine (e.g., Oven #3) if the names assigned to the two data sets appear to be variations of the same machine name (e.g., Oven #3, Oven 3, and Line 3 Oven).

Discovery component 208 can also correlate date/time stamps across data files to facilitate discovery of correlations between data items. For example, discovery component 208 may discover that two different sets of measured data indicating two non-typical events at two different production areas or machines have identical or substantially identical time stamps (within a defined tolerance of similarity). Such observations may be useful for subsequent analytics, which may determine that the non-typical events at the two production areas or machines have a same root cause.

In another example, discovery component 208 may identify identical data values in two different data files, which may indicate two instances of the same data item. Accordingly, orchestration system 202 can flag these two data items as corresponding to the same metric for the purposes of subsequent analytics.

Based on the normalized data and discovered relationship 1118, metadata generation component 210 can generate relationship metadata 922 that records these discovered classifications and relationships, and associate the relationship metadata 922 with the relevant normalized data items to which the metadata pertains. In this way, data extracted from the data files is contextualized and stored—either locally on the device executing the analytics system or on the cloud platform in the case of analytics platforms executing at on the cloud level—for analysis by a cloud-based analytics portal. This data contextualization process is performed without the need for specialized programming or data engineering on the part of the end user. In this regard, the industrial data orchestration system 202 serves as a self-learning system in which data patterns and classifications are recognized for future data correlations. In general, both on-premise applications and cloud-based applications can provide data to the event queue for orchestration and collective analysis.

In some embodiments, presumed relationships 1114 identified by the discovery component 208 can be presented to the user via a suitable client device 1124 for confirmation that the relationships are valid, allowing the user to make corrections or to manually define relationships between discovered data items. In such embodiments, client interface component 212 can be configured to generate and deliver a graphical interface to an authorized client device 1124, where the graphical interface renders identities of two or more data sets as well as an assumed relationship between the data sets ascertained by the discovery component 208. An example interface display may identify each data set in terms of the data source device or system from which the data originated (e.g., an identified industrial controller, data historian, motor drive, telemetry device, sensor, ERP or MES system, accounting system or spreadsheet, inventory database, customer database or spreadsheet, etc.) as well as the name of the data set, which may be extracted from data fields of the original data file or assigned by the discovery component 208. Names of the data sets can be generated by the discovery component 208 based on such indicators as a header or field name defined within the original data file from which the data was retrieved. Such headers or field names can include, but are not limited to column headers in the case of spreadsheet files, comma delimited field names in the case of log files, database field names, user-defined identifiers assigned to sensor data, etc.

The interface display can also render an indication of the inferred relationship between the data sets being presented for confirmation. For example, if the discovery component 208 identifies two data sets from two different data source devices (and possibly having two different data file formats) that are likely to represent the same pressure value for the same tank, the client interface component 212 can render, on the interface display delivered to client device 1024, identifiers for the two data sets—which can be based on data header or field names, or based on user-defined names, as noted above—as well as an indication that the two data sets are assumed to correspond to the same tank pressure metric. The interface display can also include a control—e.g., a confirmation button graphic—requesting confirmation that the two data sets are to be tagged as corresponding to the same tank pressure metric. Interaction with the confirmation control causes confirmation/modification data 1116 to be returned to the discovery component 208, which sets the relationship metadata 922 such that the two data sets are tagged as corresponding to the same metric. Alternatively, if the user determines that the inferred relationship between the presented data sets is not correct, the user can select another control of the interface display that over-rides the inferred relationship. Selection of this control causes the confirmation/modification data 1116 to instruct discovery component 208 to reject the inferred relationship. In some embodiments, the interface display can also allow the user to change a name associated with one or more of the presented data sets. In such scenarios, the normalized data 920 will assign the user-defined name with the indicated data set.

Identification of relationships between data items by the discovery component 208 is not limited to identification of data items corresponding to the same metric. In another example scenario, the discovery component 208 can also determine that two data items or data files from respective two different data sources, while not representing the same parameter, are both associated with the same machine, industrial system, production line, work shift, or other common entity defined for the industrial enterprise. In such cases, metadata generation component 210 can generate relationship metadata 922 to tag the two data items or files as belonging to the identified entity. In this way, the orchestration system 202 can learn and tag associations between different types of information (e.g., measured telemetry and status data from plant floor devices, work order data, inventory data, billing reports, etc.) that have not otherwise been explicitly defined as relating to a common plant entity.

In response to any relationship confirmation, relationship over-ride instruction, or modification to the data sets implemented by the user via interaction with the graphical interface, the interface returns relationship/modification data 1116 to the discovery component 208, which sets the relationship metadata 922 accordingly. Relationships that have been verified by the user do not need to be re-verified as additional data files are received at the data queues. Rather, new data from previously verified data source devices and systems is automatically classified and relationships established based on previously learned and confirmed relationships. Over time, relationship metadata 922 is accumulated that facilitates machine learning by the analytics layer (e.g., the predictive maintenance and process supervision system 302).

Returning to FIG. 10, the cloud-based analytic system 1016, as well as device-level analytic systems that execute on one or more industrial devices or on a gateway or edge device 119, can generate and deliver dashboards 1018 or other types of graphical display interfaces to authorized client devices 1020 having access to the analytic system 1016. These dashboards 1018 can allow the user to search the contextualized and normalized data stored by the analytic system 1016, or to otherwise present selected subsets of the data. In an example presentation, similar or common data from different data files or sources can be combined to produce a scatter plot, heat map, etc.

The presentation components 306 and 406 can generate customized dashboards that are specific to a given user role (e.g., operator, maintenance personnel, plant engineer, plant manager, etc.). For example, an owner of a client device 1020 can access the cloud-based analytic system 1016 by submitting security credentials and identity information that conveys the user's role to the system 1016. In some embodiments, the analytic system 1016 may push a selected subset of the normalized and contextualized data to the user's client device 1020 as part of a default or customized home screen, where the subset is selected based on information deemed relevant to the user's role. In response to a request for specific information received from the user's client device (e.g., a request for information about an indicated machine or production area, work schedule or maintenance schedule information, inventory information, power consumption statistics, etc.), the system 1016 can filter the requested information based on the user's role. For example, a line operator requesting information about a specified machine may be provided with current operating statistics, alarm information, or machine status information, while a plant engineer may be provided with more granular information relating to specific devices that make up the machine (e.g., industrial controller statuses, motor drive diagnostic information, etc.).

In some embodiments, the scalable analytic architecture can detect the presence of new devices installed at an industrial facility and integrate the new device into the architecture, thereby reducing the time required to configure collection and processing of data from the new device. In an example scenario, when a new device or new equipment is installed at the industrial facility, data generated by the new device or equipment can be detected by data queuing component 206, which collects and sends the data to the event queues (e.g., event queues 508, 812) as a new data file or as an additional set of fields of an existing (previously classified) file. The discovery component 208 can discover that the new data corresponds to a new device, and infer the new device's relationship to other previously identified devices based on techniques described above (e.g., by correlating common data values, common facility or production line names, common date/times, etc.). Based on these discovered relationships, the metadata generation component 210 can then generate relationship metadata 922 associating any relevant data from the other data sources with the new device (or vice versa). Thus, the system can automatically discover and contextualize the new device without the need to reconfigure a data warehouse to accommodate new device data.

Figure 12:
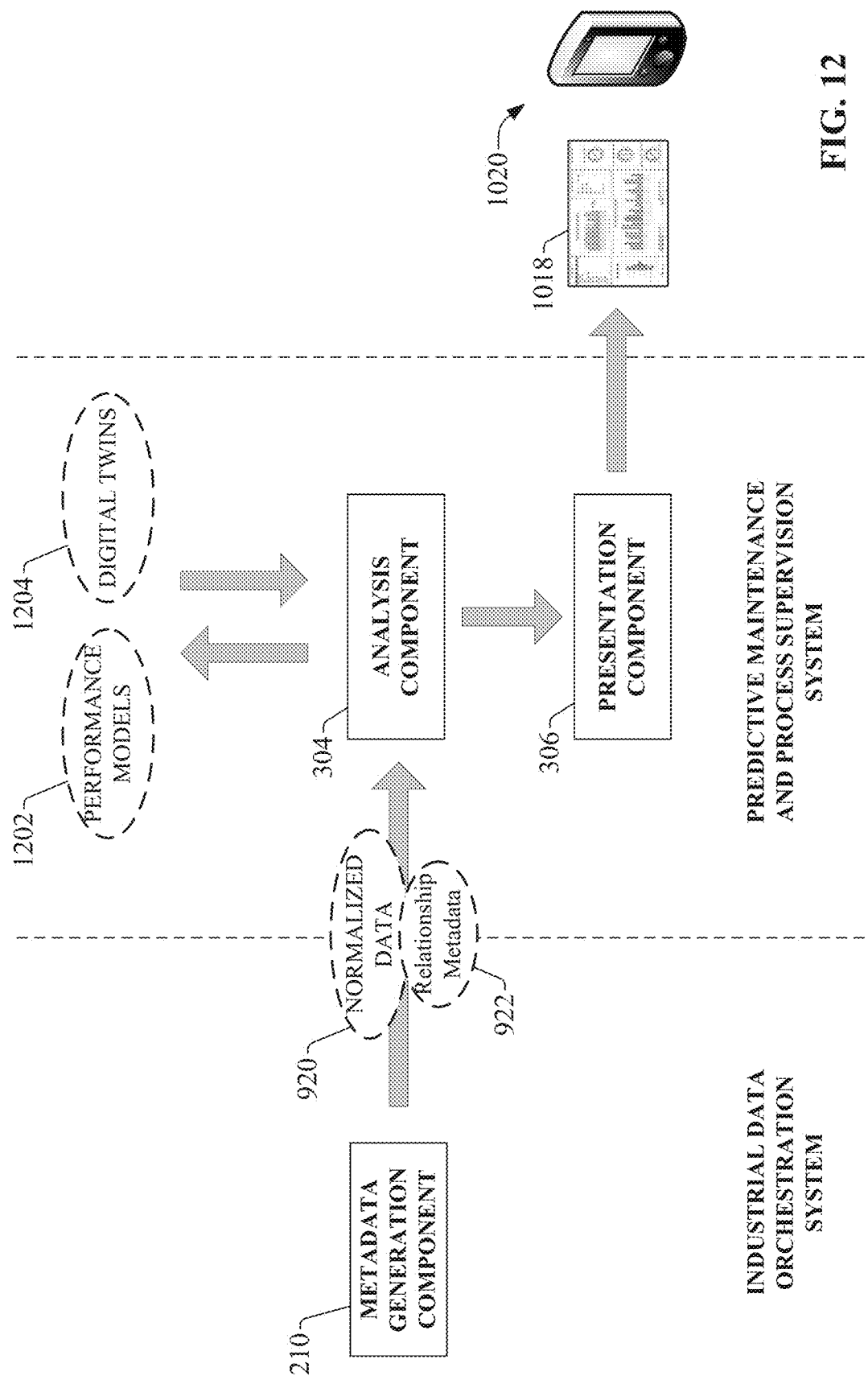
FIG. 12 is a diagram illustrating analysis of the normalized data and associated metadata in connection with generation of custom dashboards that render proactive maintenance notifications or other actionable information.

FIG. 12 is a diagram illustrating analysis of the normalized data 920 and associated relationship metadata 922 in connection with generation of custom dashboards that render proactive maintenance notifications or other actionable information. Once the structured and unstructured data has been normalized, contextualized, and stored as described above, analysis component 304 of predictive maintenance and process supervision system 302 can analyze the data 920 and associated relationship metadata 922 for predictive maintenance opportunities, or to supplement plant-level control with higher-level process supervision, and generate dashboards 1018 that convey predictive maintenance or alternative control recommendations based on results of the analysis. For example, analysis component 304 can apply classification algorithms to the contextualized data to develop model data 1202 defining models of good or normal process behavior for a machine, production line, or set of industrial assets. The model data 1202 may define normal process behavior in terms of optimal ranges of performance metrics for the machines or industrial assets, and may further define these ranges as a function of time, work shift, product being produced, or other such factors.

In one or more embodiments, analysis component 304 can identify normal or acceptable behavior of an automation system based on repeated observations of production cycles by identifying correlations between positive outcomes and values of performance or behavior metrics observed during production runs that yielded the positive outcomes. In some embodiments, the desired positive outcomes on which the model data 1202 is to be based can be selected by an administrator or other user prior to generation of the model data 1202, so that the resulting model data 1202 will be representative of acceptable automation system behavior or statuses that are expected to yield the indicated desired outcome (e.g., highest product throughput, least energy consumption, least amount of machine downtime, highest product quality, etc.). Positive outcomes that can be selected as the basis for generation of the model data 1202 can include, but are not limited to, production of parts that satisfy all quality checks, production of at least a specified minimum number of parts, acceptably small machine downtime durations or abnormal conditions, acceptably small amounts of energy consumption, or other such outcomes. The performance or behavior metrics correlated to these positive outcomes by the analysis component 304 can include, but are not limited to, machine or speed setpoints, control loop tuning parameters, machine mode settings, optimal sequences of manual control panel actuations (e.g., an order in which selector switches, push buttons, or other manual controls are actuated by the operator, which can be determined by monitoring the states of the control panel devices during various steps of the production cycle), or other such metrics.

Once this model data 1202 is developed, the analysis component 304 can monitor relevant subsets of the normalized data 920 (e.g., subsets of the data corresponding to the machine or assets to which the model applies) for deviations from the model. If the performance model data 1202 defines preferred performance metrics as a function of contextual factors—such as work shift, the product being produced, an operating mode of a machine or automation system, etc.— analysis component 304 will compare current performance (represented by normalized data 920 and associated relationship metadata 922) against the subset of performance model data corresponding to a current context of the monitored system (the current work shift, the current product being manufactured, the current machine operating mode, etc.) In response to detecting that the monitored data has deviated from the prescribed behavior defined by the model, presentation component 306 can generate and deliver alerts to appropriate users' client devices via dashboards 1018 that focus attention toward the abnormal deviations. Example dashboards 1018 may render an alphanumeric indication of the deviation, a graphic or widget illustrating a degree of the deviation, or a graphical map of the plant facility with overlaid graphical indicators directing the user's attention to a location of the deviation.

This modeling technique can also be applied to human operator behavior in some embodiments. For example, the analytic system 1016 may monitor an operator's activities indirectly by monitoring control panel interactions (e.g., push button and switch actuations; HMI interactions performed by the operator such as screen navigations, setpoint modifications, graphical push button actuations, etc.) or other data indicative of human interaction with a machine or process. The system 1016 may also monitor the operator directly using position tracking devices on the operator's person, and combine this directly monitored location data with indirect behavior data (e.g., control panel interactions) in order to accurately gauge the operator's behavior pattern or trajectory.

System 1016 can observe this operator behavior information (received as a subset of normalized data 920 and associated metadata 922) over multiple cycles of a production sequence, and identify repeated operator behaviors that correlate to positive production outcomes. As in the previous example, system 1016 can allow an administrator to define the specific desired outcome for which optimal operator behavior is to be modeled (e.g., maximum product output, minimal machine downtime duration, minimal machine abnormal conditions, etc.). In some scenarios, the defined desired outcome can relate to a specific step of the overall production cycle requiring human intervention, such as clearance of a part jam on a production line. Once an administrator has specified the desired outcome for which preferred operator behavior is to be modeled, system 1016 can begin monitoring appropriate subsets of normalized data 920 and associated relationship metadata 922 over multiple production cycles to learn a correlation between specific operator actions or sequences of actions and instance of the desired outcome. Based on these learned correlations, system 1016 will generate operator model data recording these learned operator behaviors that are determined to correlate with the desired outcome. Example operator sequences modeled by this operator model data can include, but is not limited to, timing and order of manual control panel and/or HMI interactions, locations of the operator relative to the machine or system during particular stages of the production cycle, or other such operator behaviors. As in previous examples, system 1016 can generate different operator behavior models for the same desired outcome as a function of contextual conditions, such as machine operating mode, a particular part being produced, or other such contextual factors.

Once operator behavior model data has been generated, system 1016 (e.g., analysis component 304 of the predictive maintenance and process supervision system 302) can compare subsequent observed operator behavior with these defined models of preferred operator behavior relative to a function being carried out by the operator. In an example scenario, a model of preferred operator behavior may define a correct or preferred sequence of operator actions to complete a defined procedure associated with a current step in a controlled process. Based on a comparison of the operator's monitored actions with this model, analysis component 304 can determine that the operator has skipped a step defined by the model of preferred human operation for the procedure (e.g., a start-up step, a part load or unload step, a requirement to switch a machine to semi-auto mode, etc.). In another example, analysis component 304 may identify an improper material line-up (e.g., Tank A filled with content instead of Tank B).

In addition to monitoring for operational deviations, some embodiments of predictive maintenance and process supervision system 302 can also monitor maintenance or rebuild activities within a plant, to ensure that these activities are being carried out according to learned best practices. For example, some subsets of normalized data 920 and associated relationship metadata 922—obtained from the structured and unstructured data 902a, 902b collected from plant devices, assets, and systems—may comprise data relating to an equipment rebuild operation (e.g., a rebuild of a stamping press or other such machine). This data may include identities of machine parts or components being installed in the equipment during the rebuild process, which may be obtained by scanning optical part identifiers or by other identification means. During the rebuild operation, analysis component 304 may determine that installation of a critical internal part (e.g., a positioner spring) has been skipped, and in response, the presentation component 306 can send notifications to personnel associated with the rebuild notifying of the missed installation step. This notification can be delivered substantially in real-time before the rebuild is complete, affording an opportunity for the builder to install the missing part without the need to disassemble the equipment.

Also, in some embodiments, analysis component 304 can identify undesirable or unacceptable cycle time deviations relative to a preferred cycle time range for a given machine or process step. In such embodiments, subsets of normalized data 920 and its associated relationship metadata may include cycle time data for one or more machines or production lines, and performance models (defined by model data 1202) can include definitions of cycle time ranges deemed to be optimal for the machine or production line. Analysis component 304 can compare the cycle times defined by the relevant sets of normalized data 920 with the defined optimal cycle times, identify when the actual cycle times deviate from the modeled cycle times, and report these deviations via dashboards 1018. In some embodiments, analysis component 304 can also leverage analytics to identify past causes of lost equipment cycle time based in part on the correlations discovered by the discovery component 208 of orchestration system 202 and recoded in the relationship metadata 922. In an example scenario, analysis component 304 can identify a correlation between instances of a machine cycle time deviation and a status of another related machine elsewhere in the plant, or another recurring event that occurs within the plant. Once the analysis component 304 discovers such a correlation (and that the correlation is verified based on repeated correlated instances of cycle time deviations and the event, with a minimum degree of certainty), the presentation component 306 can generate and deliver a dashboard 1018 identifying the discovered cause of the machine cycle time deviations.

In other example analytic applications, some subsets of normalized data 920 and associated relationship metadata 922 can represent production losses, or may represent information that can be used by the analysis component 304 to compute production losses (e.g., losses in product output due to machine downtime conditions, rejected product units, etc.). Some embodiments of analysis component 304 can continuously monitor these production losses based on real-time analysis of the normalized data 920 and compare these losses with a defined planned or optimum loss defined by model data 1202. Results of this comparison can also be reported via dashboard 1018. Since normalization of the disparate structured and unstructured data 902a, 902b allows analysis component 304 to identify correlations between diversely sourced and formatted data sets, the analysis component 304 can identify correlations between excessive production losses and specific plant events that have a likelihood of causing the production losses, even though the data used to calculate the production losses and the data representing the plant events may originate from different devices or systems and may have different data formats prior to normalization. In example scenarios, analysis component 304 may identify, as the events correlated to production losses, starvation of incoming materials at an upstream machine or production line, plant or equipment power losses, part rejections due to quality check failures, improper or sub-optimal sequencing of manual operations by operators, etc.

In another example, analysis component 304 can also include quality estimation features whereby an online virtual analyzer forecasts real-time quality to support improved product quality or reduced give-away (specification exceedance). The system can identify factors that are causing quality deviation of finished products.

Since predictive maintenance and process supervision system 302 can collect and perform analytics on data received from multiple industrial facilities owned by a given industrial enterprise, some embodiments of analysis component 304 can also perform multi-site analysis to facilitate optimization of resource utilization across different production facilities. In an example application, analysis component 304 can evaluate comparable metrics across multiple industrial facilities that are capable of processing a given product order and, based on these evaluations, make decisions regarding which site should be used to process a given product order. This decision can be based on any suitable selection criteria, including but not limited to least processing time, least energy consumption, highest quality, least number of rejected parts, least amount of waste, lowest cost, etc.

In some embodiments, predictive maintenance and process supervision system 302 can also perform validation of data generated by sensors or other instrumentation that measure aspects of a controlled machine or process. In such embodiments, analysis component 304 can develop, as part of model data 1202, sensor backup models for key sensors, instruments, or other sources of operational and/or status data. These sensor backup models can define, for example, explicit or inferred operational ranges for each sensor or instrument, valid rates of change of measured data for each sensor or instrument, or other such metrics of sensor validity.

The sensor models may also identify two or more different sources of the same measured value. These different sources may be, for example, a directly measured value of a performance parameter generated by a sensor device and a calculated value of the same parameter determined by a separate reporting system based on other measured or collected values). During plant operation, analysis component 304 can compare subsets of the normalized data 920 generated by a sensor or instrument with its corresponding sensor model to determine whether there is a likelihood that the sensor is generating invalid data. In example scenarios, the analysis component 304 can identify potentially invalid sensor data based on a determination that the normalized sensor data falls outside a valid range defined by the sensor's model, or that the normalized sensor data is changing at a rate that exceeds a valid rate of change defined by the sensor model. If the normalized data 920 includes two different sources for a given measured value (e.g., two measured sensor values, or a measured value and a calculated value), the analysis component 304 may also identify invalid sensor data based on a determination that the normalized values received from the different sources do not match within a defined tolerance range. Such deviations of sensor data from their expected values can be due to such causes as sensor drift or sensor failures.

When the analysis component 304 identifies potentially invalid sensor data, presentation component 306 can alert operators of the deviations via dashboards 1018. These notifications can include an identity and/or location of the sensor for which bad data has been identified, and in some embodiments may also include recommendations for correcting the sensor data based on an inferred cause of the deviation. For example, if analysis component 304 determines that the deviation is due to drift, the notification may recommend recalibrating the sensor to bring the generated values back within the valid range. In another example specific to photo-sensors or optical sensors, the analysis component 304 may determine that the deviation is due to pollution (e.g., smoke, dust, or other particulates) within the atmosphere near the sensor or on the sensor's receiving components, and recommend cleaning the sensor's receiving components or clearing the environment surrounding the sensor. The notifications may also recommend replacing the sensor if analysis component 304 determines that sensor failure is the cause of the deviation. Identification of invalid sensor data substantially in real-time can mitigate bad decision-making by control systems due to faulty sensor data.

In addition to identifying maintenance or performance issues, some embodiments of predictive maintenance and process supervision system 302 can also generate recommendations for countermeasures to identified issues, including recommendations that consider multiple manufacturing sites that comprise an industrial enterprise. This can include, for example, recommending that an operation be dispatched to an alternate site, re-planning availability to ship, triggering a new scheduling run, etc. Some embodiments of system 302 can also learn to identify factors that impact production, taking into consideration energy cost/usage, labor cost, machine downtime, etc.

In some embodiments, predictive maintenance and process supervision system 302 can support generation of digital twins 1204 for equipment (e.g., controllers, turbines, etc.) based on the aggregated normalized data 920 and associated relationship metadata 922. In such embodiments, analysis component 304 can compare incoming data for the equipment with its corresponding digital twin 1204 to identify deviations. In some embodiments, the system 302 can create different digital twins 1204 for the same set of equipment, with each digital twin 1204 corresponding to a different version of the equipment as a function of the type of environment in which the equipment is deployed. In an example scenario, a first digital twin 1204 may be created for a set of equipment or industrial assets corresponding to deployment of the equipment in a wet location, while a second digital twin 1204 may be created corresponding to deployment of the equipment in a dry or dusty location. Since these different types of environments can predictably impact the manner in which the equipment performs, each digital twin 1204 can reflect the expected performance of the equipment within a specified type of environment. When new equipment is deployed at a new location, the analysis component 304 can reference the digital twin 1204 corresponding to the type of equipment and the type of environment in which the equipment is deployed, and use this digital twin 1204 in conjunction with predicting maintenance issues or generating operational recommendations for the new equipment (e.g., predicting equipment life span, generating recommended maintenance schedules, etc.).

Also, in some embodiments the analysis component 304 can include a safety/risk estimator that develops, as part of model data 1202, predictive models of safety incidents based on the stored orchestrated and normalized data 920 and relationship metadata 922. These predictive models can be run against real-time data obtained from normalized data 920 to identify a current risk level associated with a machine, production line, industrial device, or other industrial asset. This technique can assist in making decisions regarding overtime approval, whether to continue or defer new product tests, or other items that influence risk factors.

Some embodiments of predictive maintenance and process supervision system 302 can also support inventory and change management analytics. This can include automated analysis of industrial devices, organized in a defined organizational hierarchy based on the contextualized data, with asset criticality layered over the top. Pre-defined analytics implemented by analysis component 304 can identify top asset and device risks due to lifecycle status, firmware, software compatibility, failure and repair history, security vulnerabilities, product safety advisory, device configuration changes, controller program changes, software configuration changes, etc. This data can be connected to a data driven services platform to provide asset management, inventory management, repair services, and migration services.

For multi-site applications, the analysis component 304 can make determinations as to which site should make a given product or handle a given order, or identify dispatch changes that would reduce costs to produce or leverage spot energy opportunities. Similarly, the analysis component 304 can identify which site would best serve as a test facility for a new product or technology roll-out.

In some embodiments, the analysis component 304 can also track product output relative to a defined annual target and anticipate whether the target will be achieved given the current year-to-date product quantity, historical production rate trends for the year thus far, and other factors. If the system 302 anticipates that there is a risk that the target will not be achieved by a defined year end date, the system 302 will identify possible causes of the failure to meet the target, or possible modifications to the production process that can increase the likelihood of achieving the production target by the year end date.

In some embodiments, the manner of analysis performed on the orchestrated data for a given type of assessment can be industry- or vertical-specific. For example, the type of industry within which the machine or process is being used (e.g., automotive, food and gas, mining, power generation, textiles, pharmaceutical, plastics, etc.) can determine the type of analysis performed by the analysis component 304 to generate a process model of preferred operation of the machine or process (as described above) and to compare real-time performance metrics relative to the model. Such industry-specific analysis can capture common practices or standards that are unique to each particular industry.

Figure 13:
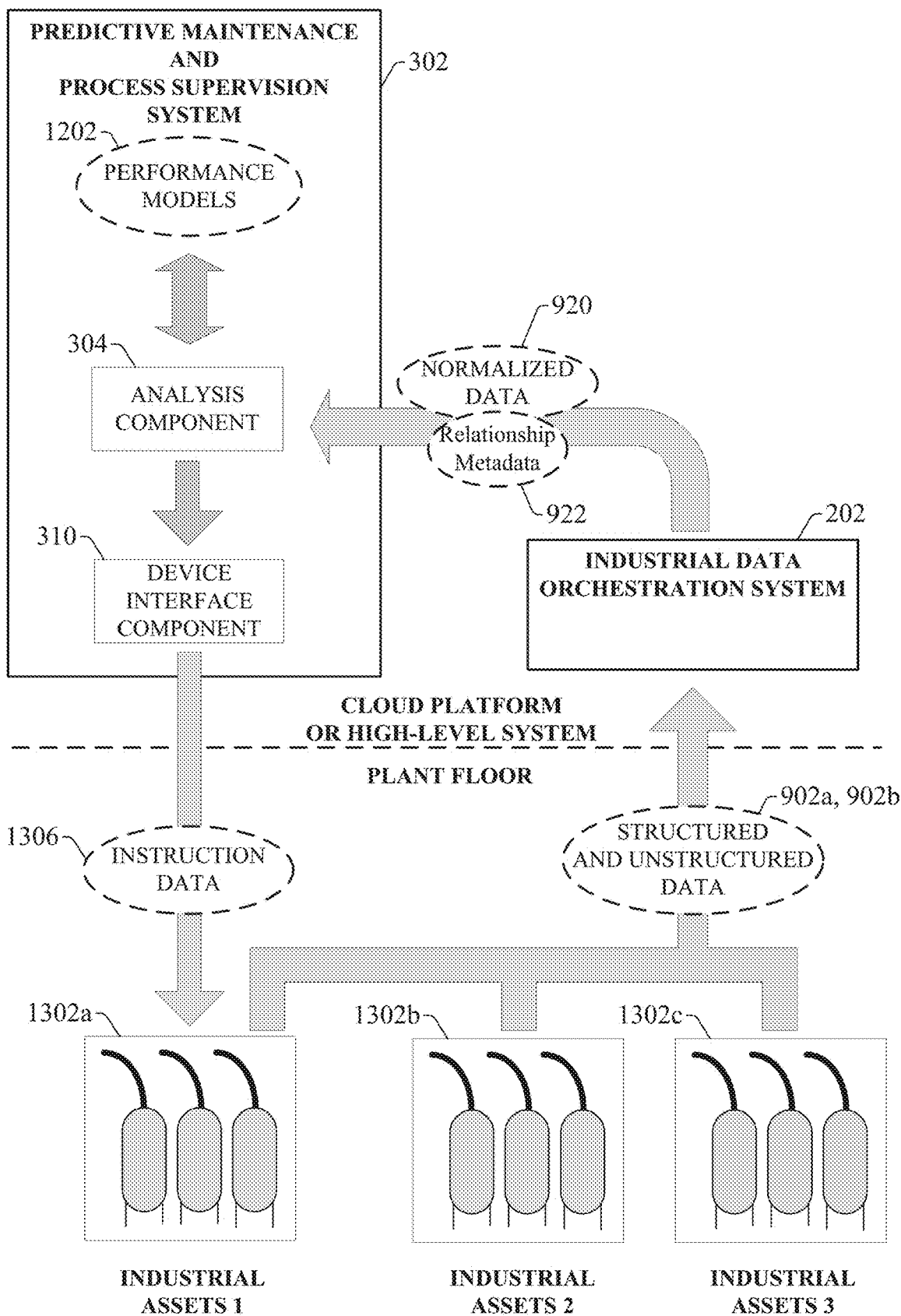
FIG. 13 is a diagram illustrating an example architecture that implements control modifications to industrial assets based on analysis of the normalized data and associated metadata.

In some embodiments, rather than or in addition to delivering notifications via dashboards 1018, the analytic system 1016 may also be configured to deliver control instructions to one or more industrial assets to alter a controlled process based on the detected deviation or another result generated by analysis component 304. FIG. 13 is a diagram illustrating an example architecture that implements control modifications to industrial assets based on analysis of the normalized data 920 and associated relationship metadata 922. As described in previous examples, industrial data and orchestration system 202 collects or receives structured and unstructured data 902a, 902b from devices, systems, and/or applications distributed throughout an industrial environment. This can include data received from sets of industrial assets 1302 that operate on the plant floor. These industrial assets 1302 can include automation or process control systems that each include one or more industrial controllers and associated input devices, output devices, and peripheral devices (e.g., motor drives, vision systems, lot control systems, quality check systems, etc.) that perform automated control of a machine or process. Orchestration system 202 normalizes the structured and unstructured data 902a, 902b, records discovered relationships between the data items and/or files as relationship metadata 922, and provides this information to predictive maintenance and process supervision system 302.

As described in previous examples, the analysis component 304 of system 302 can be configured to perform one or more types of analysis on the normalized data 920 and associated relationship metadata 922. This analysis may be performed in conjunction with model data 1202 or digital twins 1204. In the examples described above, results of the device-level, edge-level, system-level, or cloud-level analytics are rendered on dashboards 1018 or other graphical displays rendered on one or more client devices 1020 associated with selected personnel (e.g., selected by the system based on the nature of the information being presented and the machine or production area to which the information relates). In the example embodiment depicted in FIG. 13, predictive maintenance and process supervision system 302 can, in addition to or as an alternative to rendering analytic results on dashboards 1018, generate instruction data 1306 directed to one or more control devices (e.g., industrial controllers, drives, peripheral systems, etc.) based on results of the analytics. In such embodiments, any of the example types of analysis described above can result in instruction data 1306 being generated and sent to one or more relevant control devices.

In an example relating to embodiments in which analysis component 304 monitors subsets of the normalized data 920 for deviations from preferred operation defined in model data 1202, in response to determining that a performance indicator represented by normalized data 920 has deviated from the model data 1202, analysis component 304 can identify a change to a modifiable parameter of an industrial controller or other control device that, if implemented, would have a likelihood of altering operation of the controlled machine or process in a manner that brings the performance indicator back into compliance with the model data 1202. This change can be, for example, a setpoint modification (e.g., a change to a speed, flow, pressure, etc.), a change to an operating mode of a machine or automation system, initiation of an alternate control program or subroutine on the control device, or other such modification. Analysis component 304 can then generate instruction data 1306 containing an instruction that, when executed by the target control device, will implement the identified modification. Device interface component 310 can then send the instruction data 1306 to the target control device (e.g., a device of one of the sets of industrial assets 1202a) to alter operation of the control device.

Other types of analysis can also yield instruction data 1306 in some embodiments. For example, embodiments of system 302 that include a safety/risk estimator can generate instruction data 1306 that modifies operation of a controlled system in response to determining that a current risk level associated with the controlled system exceeds a threshold defined by predictive models of safety incidents defined by model data 1202. This can include, for example instruction the controlled system to switch to a slow operation mode or a stopped mode, turning on a stack light or other indicator to convey that a risk level associated with the controlled system is elevated, or other such control actions.

If system 302 is executing locally on the relevant industrial device (e.g., a device-level analytics system), analysis component 304 may only need to generate the instruction data 1306 for local execution on the industrial device (e.g., to change a setpoint or other control parameter on the device). If system 302 is executing on a gateway device 119 (e.g., an edge-level analytics system), instruction data 1306 can be sent to the relevant control device via the wired or wireless network(s) over which the gateway device 119 collects data from its assigned set of industrial devices. If system 302 is executing on a cloud platform (e.g., a cloud-level analytics system), instruction data 1306 can be delivered from the cloud platform to the target control device via any intermediate networks (e.g., the internet, the plant network, public or private subnets, etc.). In some embodiments, instruction data 1306 can be sent to the relevant control device via industrial data orchestration system 202 via the same data channels over which the structured and unstructured data 902a, 902b is collected.

In addition to directing instruction data 1306 to control devices on the plant floor to effectuate modifications to controlled industrial systems, some embodiments of system 302 can also perform modifications to related systems or applications that are not directly involved in control of the industrial machines or processes. For example, some embodiments of system 302 can modify maintenance schedules, work schedules, production schedules, or other related schedules based on results of the analysis performed by analysis component 304. In an example scenario, analysis component 304 may determine that a performance metric of a controlled process is beginning to drift and is expected to fall outside the preferred range for that metric defined by model data 1202. Based in part on the relationship metadata 922, analysis component 304 may also identify the relevant industrial devices, machines, or machine components that are likely causes of the performance drift. In response to these determinations, analysis component 304 can modify a maintenance schedule stored on a plant server to expedite maintenance for the identified device, machine, or component (e.g., by moving forward a scheduled maintenance date for the identified equipment).

Figure 14:
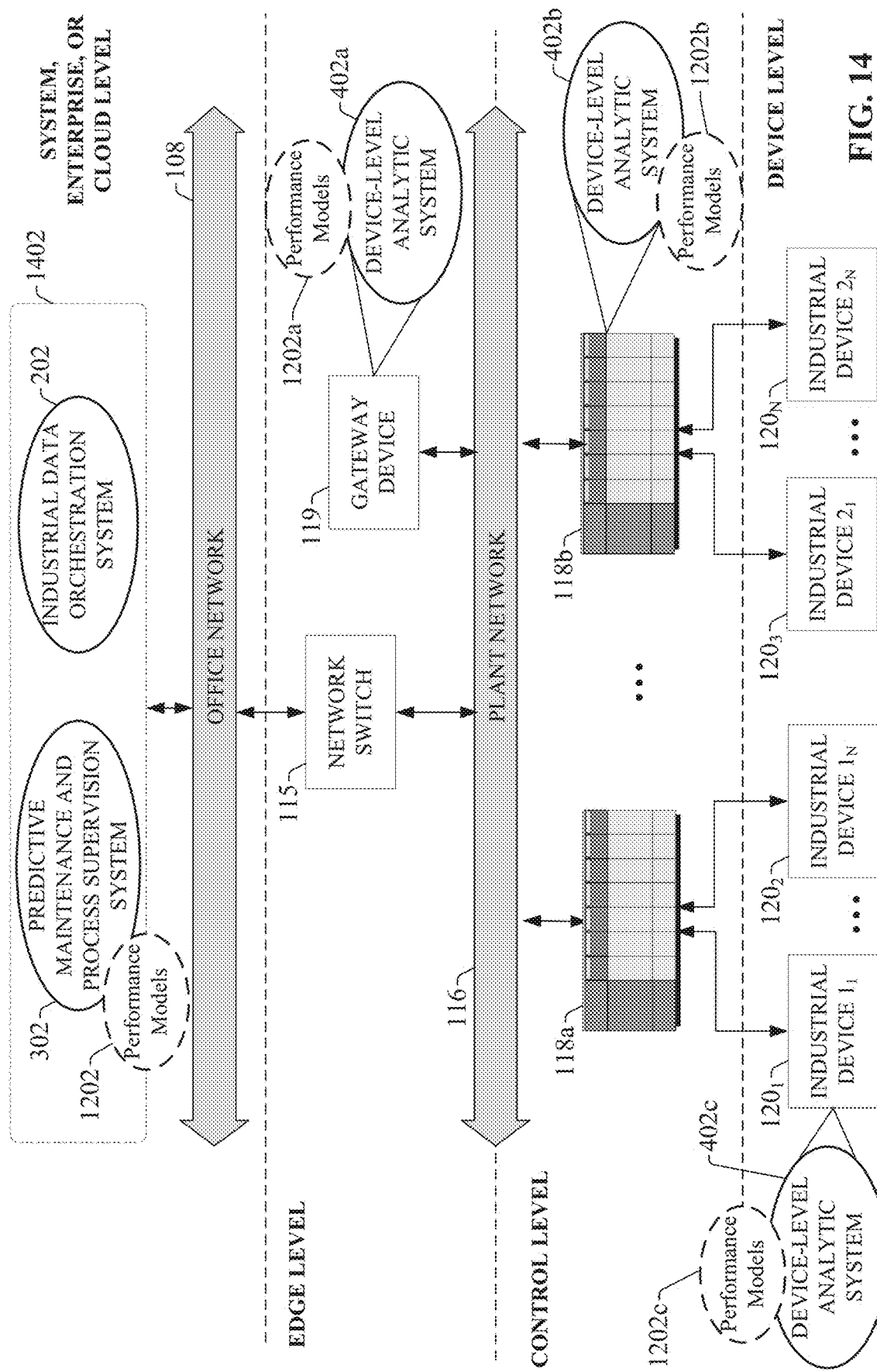
FIG. 14 is a diagram illustrating an example architecture that supports scaling of analytics between levels of an industrial enterprise.

As noted above, while some example analyses described above have been high-level analysis executed on a cloud platform or on a business-level or other high-level device of an industrial enterprise, some embodiments of the analytic architecture described herein support scaling or transferring of analytics to other levels of the enterprise—e.g., the edge level, equipment level, or device level—on which the analysis is considered most appropriate. FIG. 14 is a diagram illustrating an example architecture that supports scaling of analytics between levels of an industrial enterprise. Analytics performed on the device level or system level (e.g. on an industrial controller 118 or an industrial device 120 a motor drive, telemetry device, etc.) or on the edge level (e.g., on a gateway device 119) can be carried out by device-level analytic systems 402, which execute on their associated industrial device or gateway device as an embedded subsystem of the device. The type of analyses performed by device-level analysis component 404 can be substantially similar to the analyses performed by analysis component 304 of predictive maintenance and process supervision system 302. However, the data on which a device-level analytic system 402 performs its analysis is typically limited to data that originates on, or is received by, its host device. For example, embodiments of device-level analytic system 402 that operate on an industrial controller 118 (e.g., analytic system 402b) or another industrial device 120 (e.g., analytic system 402c) can perform analysis on data generated by the industrial device itself (e.g., data stored in the controller's data table, input data received from a controller's input modules, etc.). In general, analysis performed by the device-level analysis component 404 will be scoped to the device hosting the device-level analytic system 402.

Similarly, embodiments of device-level analytic system 402 that operate on a gateway device 119 (e.g., analytic system 402a) can perform analytics on data received from a set of industrial devices 118, 120 serviced by the gateway device 119 (that is, devices that are networked to the gateway device 119 for the purpose of migrating data from the devices to a cloud platform via gateway device 119). In this regard, edge-level analytics performed by device-level analytic systems 402a that are hosted on gateway devices 119 may have a broader analytic scope than systems 402 residing on industrial devices 118 or 120, since gateway devices 119 may service a larger number of industrial devices and/or systems.

Similar to embodiments of the cloud-level analytics performed by predictive maintenance and process supervision system 302, some embodiments of device-level analysis component 404 can generate a digital twin of an item of equipment associated with the host device on which the device-level analytic system 402 executes, or of the host device itself. The digital twin and associated analytics can execute on this device level, or can be deployed to the cloud level to be used in connection with big data analysis for the larger industrial enterprise.

Within an architecture comprising one or more device-level analytic systems 402 residing on industrial devices 118, 120 and/or gateway devices 119, and one or more higher level analytic systems such as predictive maintenance and process supervision system 302 (working in conjunction with orchestration system 202) operating on a cloud platform 1402 or on an enterprise-level server, a device-level analytic system 402 can perform analytics on the device or system level when appropriate (e.g., on industrial controllers 118, industrial devices 120, and/or gateway devices 119), and analytic scaling component 408 can shift analytics tasks to the cloud platform 1402 (or other higher level) to perform analytics scoped to the enterprise level as needed. For example, industrial devices 118, 120 (e.g., controllers, motor drives, HMI terminals, sensors, vision systems, etc.), cloud gateway devices 119 or edge devices, and/or stand-alone analytic devices can execute device-level analytic systems 402 that function as analytic nodes within the architecture described above. These device-level analytic systems 402 can perform local analytics on device data when device-level or equipment-level results are required. Device-level analytics performed by analytic systems 402 can include, but are not limited to, determining whether a particular industrial device (e.g., a controller, sensor, drive, meter, etc.) is at risk of failure or should be replaced based on analysis of local data associated with that device (or data associated with a process or machine controlled by the device). As in previously described examples, such determinations can be based on a comparison of real-time, normalized data 920 and associated relationship metadata 922 with model data 1202 stored on the respective device-level analytic systems 402. Model data 1202 can define characteristic trends of certain performance parameters, diagnostic variables, or other device or system variables that are indicative of an impending device or system failure.

Results of the device- or equipment-level analytics can be consumed locally by the host device itself, or sent to a respondent by presentation component 406 (e.g., as a notification or dashboard directed to a client device associated with a user). For example, in response to a determination by device-level analysis component 404 that the industrial controller or device that hosts analytic system 402 is at risk of failure or an unacceptable loss of efficiency, and if the analysis component 404 identifies an automated countermeasure that may mitigate or delay the device failure, analysis component 404 can generate a control instruction that implements the countermeasure on the host device; e.g., by altering the device's operation in a manner that has a likelihood of mitigating the failure. Such countermeasures can include, but are not limited to, switching the device to a slow operation mode or stopped mode, switching the device to a backup power supply, changing a setpoint defined in the device, initiating execution of a different control program or sub-routine (in the case of industrial controllers or other programmable devices), or other such countermeasures.

In the case of device-level analytic systems 402 residing on industrial controllers 118 or gateway devices 119, risks associated with operation of more complex industrial automation systems—rather than a single device—can be monitored and identified, and appropriate countermeasures that are scoped to the entire automation system can be implemented. In an example scenario, if a device-level analytic system 402 executing on a gateway device 119 predicts—based on analysis of normalized data 920 and associated relationship metadata 922 in view of model data 1202 or a digital twin 1204—that a production line is at risk of producing an excessive amount of product waste (e.g., due to an increase in the number of part rejections, a discovered inefficiency in a process carried out by the production line, an indication of excessive wear on one or more devices that carry out the process, etc.), the device-level analytic system 402 can implement a multi-device countermeasure intended to mitigate the risk of product waste. This can involve generating, by the gateway device 119 under the instruction of the device-level analytic system 402, multiple sets of instruction data directed to devices that make up the automation system, where the instructions are configured to alter operation of the target devices in a coordinated manner to effect the countermeasure on the automation system as a whole, thereby reducing the risk of product waste. Such system-wide countermeasures can include, for example, reducing the rate of production on a production line, switching production of the product to an alternative production line (which may involve sending instructions to control devices of the current production line to cease production, sending further instructions to the new production line to begin production, and sending still further instructions to appropriate upstream systems to begin providing material or parts to the new production line), sourcing a production line with parts from an alternate production line or source, or other such countermeasures.

In addition to monitoring devices and systems and implementing control modifications as needed, device-level analytic system 402 can also send (via presentation component 406) analytic results to appropriate client devices in the form of notifications, dashboards, or other graphical interfaces.

In addition, when appropriate, the analytic scaling component 408 of device-level analytic systems 402 can send results of local analytics to the cloud platform 1402 (or other high-level enterprise system on which predictive maintenance and process supervision system 302 resides) for enterprise level analysis. This can be achieved by sending the local result data from the device-level analytic system 402 to the orchestration system 202 so that the result data can be placed in the event queues 508 for processing by system 302. The device-level analytic system 402 can also send results of the local analytics to another device-level analytic system 402 on the same level or a different level of the enterprise. Analytic results sent from one of the device-level analytic systems 402 to either another device-level analytic system 402 or to a cloud- or enterprise-level system 302 can be processed at the receiving system for further analytics. In this way, device-level analytic systems 402 can carry out inter-node collaborative analysis in connection with performing plant-level analytics, such that analytical tasks are carried out at the level of the enterprise (e.g., enterprise level, plant level, business level, edge level, equipment level, device level, etc.) deemed most suitable for the given analytical task. Analytics can also be scaled downward from higher levels to lower levels as appropriate.

In an example scenario, the decision to scale analytics upward or downward between analytic systems 302 and 402 can based on a time-sensitivity of the analytics being performed. For example, if the predictive maintenance and process supervision system 302 is performing analysis on a current production run of a product in which the result of the analytics may determine how the current run is to be executed, analytic scaling component 312 of system 302 may shift at least a portion of the analytic processing to a device-level analytic system 402 hosted on an industrial controller 118 or industrial device 120 that is part of the automation system executing the production run. By shifting relevant analytics to the device-level analytic system 402 hosted on a controller or device that participates in the control process, the analytic result generated by the device-level analytic system 402 can be leveraged more readily by the control devices that control the industrial process. In general, analytic scaling components 312 and 408 of predictive maintenance and process supervision system 302 and device-level analytic system 402, respectively, can be configured to identify criteria indicating that data or analytic results are to be scaled or transferred to another analytic system; namely, the particular device, group of devices, industrial assets, or systems affected by a result of the analysis.

The decision by the analytic scaling components 312, 408 to send analytic results or other locally available data to another analytic system can be based on a determination of whether the result or data satisfies a criterion indicative of an importance or relevance of the result or data to another portion or layer of the overall enterprise architecture. For example, if an analytic result generated by a device-level analytic system 402 or a predictive maintenance and process supervision system 302 is determined to satisfy a defined criterion indicative of a relevance of the result to a work order management system on a system layer of the enterprise, the analytic system 302 or 402 will send the result data and any other relevant data to another analytic system associated with the work order management system or the system-layer on which the work order management system resides.

In some embodiments, the client interface components 308 and 410 of analytic systems 302 and 402, respectively, can include analytic engine designer tools that allow a user to define criteria for moving data and/or analysis results to other analytic systems on higher or lower layers of the system architecture. These tools can include, for example, configuration interface displays rendered on a user's client device by the client interface components 308 and 410, which can allow the user to define migration or scaling criteria to be associated with selected types of analysis results. Criteria for migrating data or analysis results to other analytic systems (systems on the same level or on a higher or lower layer of the industrial enterprise) can be defined in terms of specific data items (e.g., by specifying data items or analysis results that are always to be moved upward to an identified analytic system 402, 302 on a higher layer), or in terms of specific contexts, conditions, or analytic results. For example, the user may configure the analytic scaling component 408, 312 of an analytic system to move selected data items to a specified higher-level analytic system 302, 402 if the analytic system determines (based on the normalized data 920) that a specified machine is in an abnormal state or other defined state. This configuration may be useful if a predictive maintenance and process supervision system 302 is to perform certain diagnostic analytics only in the event that the specified machine is in the defined state, and so only requires data relating to the machine while the machine is in the defined state. Deferring transfer of data or analytic results from the device-level analytic systems 402 to higher-level analytic systems such as system 302 until that data is required by the higher-level analytic systems (e.g., as determined based on a current machine context) can reduce network bandwidth, storage, and processing requirements.

In another example, the user may configure analytic scaling component 312, 408 such that, if a data value or an analytic result generated by one of the analytic system satisfies a criterion, the analytic result and/or one or more selected data items are to be sent to a higher-lever analytic system for further processing by the higher-level analytic system. The criterion may be indicative of a relevance of the data item or analytic result to devices or systems at the higher layer, or a defined scope of responsibility for a specified analytic result (e.g., whether the result is relevant only to the host device itself, or rather is relevant to wider system operation or plant-level reporting). The user's defined analytic scaling criteria can be stored on memory associated with the analytic system (e.g., memory 318 or 418) as part of the system's analytic profile.

During operation, the configured analytic system 302 or 402 can identify the data items or analytic result data specified by the user configuration data, and retrieve values of the specified data items or results from the host device's memory. For example, in the case of a device-level analytic system 402b executing on an industrial controller 118, the system 402b can retrieve the relevant data from the controller's data table or runtime execution engine, which executes the industrial program code installed on the controller. If the controller 118 includes a historian module, the analytic system 402b can also receive data items from the historian storage. The analytic system 402b can also write values or commands to the controller's execution engine in accordance with analysis results generated by the analytic system 402b. For example, device-level analytic system 402b may change setpoint values used by the controller's program code to regulate an aspect of a controlled machine or process, or may change values of other data tags used by the program code. Also, the analytic system's presentation component 406 can send data, analysis results, or notifications to client devices 1020 or HMI terminals 114 for rendering to a user (e.g. via thin clients executing on the client devices 1020). Presentation component 406 can send this data to the client devices 1020 over a physical or wireless network, or via a public or semi-public network such as the Internet or a cloud platform.

Figure 15:
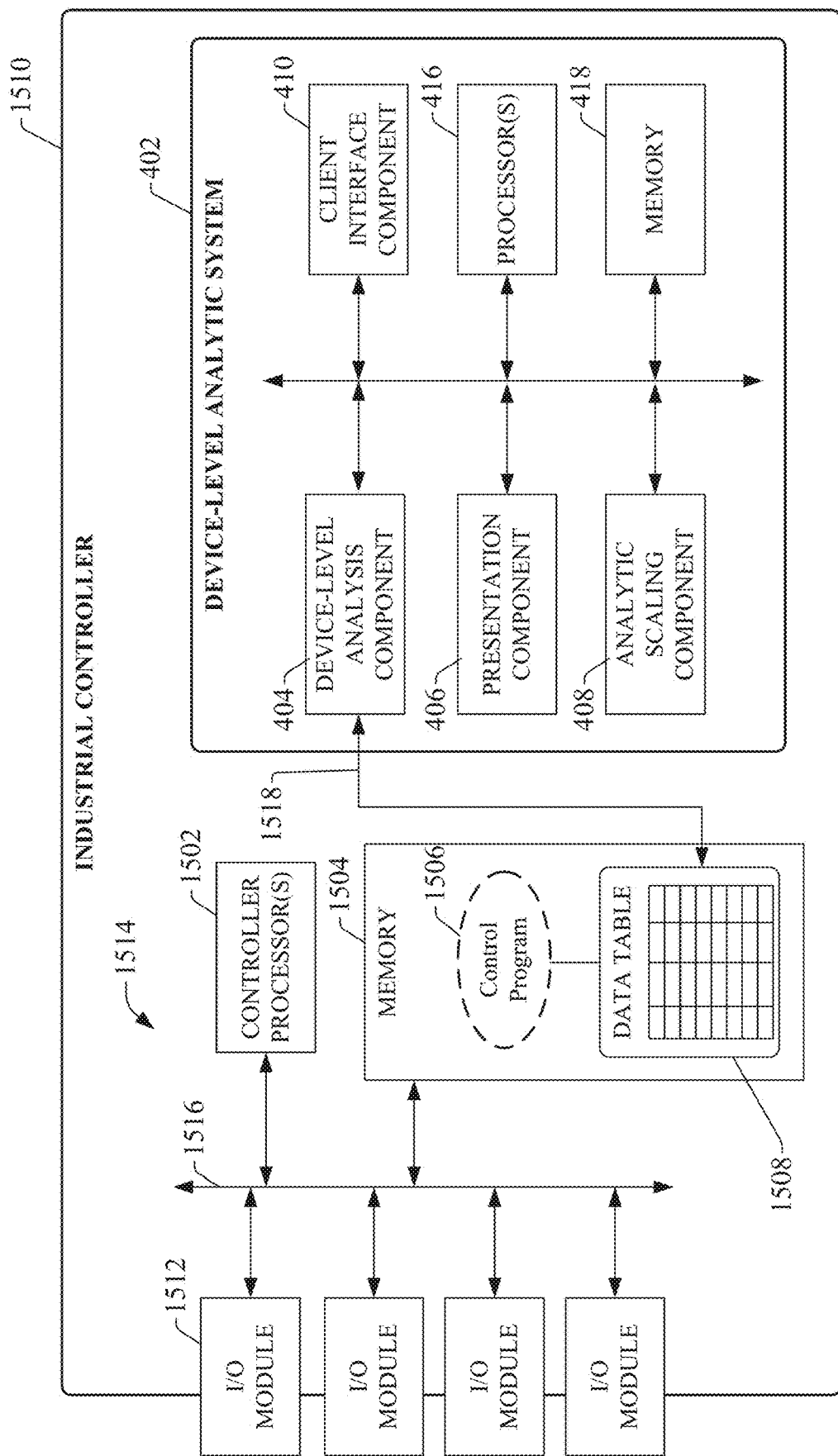
FIG. 15 is a diagram of an example industrial controller in which hardware and processing resources for carrying out device-level analytics are segregated from processing resources that carry out the controller's control functionality.

In some embodiments, functionality of the device-level analytic system 402 can operate separately from any control-related analytics being carried out by the host device, and is platform-independent. FIG. 15 is a diagram of an example industrial controller 1510 in which hardware and processing resources for carrying out device-level analytics are segregated from processing resources that carry out the controller's control functionality. In this example controller 1510, control components 1514 can include a memory 1504 on which is stored the control program 1506 executed by the controller 1514 and the data table 1508 that stores real-time values of the controller's digital and analog inputs and outputs, setpoint values, calculated values, or other data tag values. Control components 1514 also include one or more I/O modules 1512, which interface the controller with input and output devices (not shown) that make up a controlled industrial system or process. I/O modules 1512 are communicatively connected to the controller's backplane 1516 or communication bus, and exchange data with the data table 1508 via the backplane 1516. I/O modules 1512 can include input modules that measure aspects of the controlled system as digital and/or analog signals (e.g., 4-20 mA signals, 0-10 VDC signals, switched input voltages, etc.) and write these values to designated data tags or memory addresses of data table 1508. I/O modules 1512 can also include output modules that read digital or analog values from designated data tags or memory addresses of data table 1508 and translate these values into output signals (e.g., switched outputs, 4-20 mA output signals, 0-10 VDC output signals, etc.) directed to output devices of the controlled system. One or more controller processors 1502 or execution engines execute the control program 1506 and control updating of data values in the data table 1508 in accordance with measured data from the I/O modules 1512 and execution of the control program 1506.

In this illustrated example, device-level analytic system 402 is embodied as a sub-system of controller 1510, and is implemented using separate memory and processing resources from control components 1514. For example, analytic system 402 can utilize its own processor 416 and memory 418, which are separate from controller processor(s) 1502 and memory 1504. In this way, analytic processing performed by the device-level analytic system 402 is segregated from the control-related analytics, and is not necessarily implemented using the primary control language of the controller 1510. While device-level analysis component 404 can read data from and write data to the controller's data table 1508 (e.g., via a data buss 1518) in connection with performing device-level analytics on the data or implementing a control modification based on a result of the analytics, the processing resources used to carry out the analytics are physically separated from those used to carry out control. In this way, analytics carried out by the device-level analytic system 402 does not impact performance of the controller's basic control functionality. Although FIG. 15 depicts the embedded device-level analytic system 402 as being a sub-system of an industrial controller, analytic system 402 can also be embedded on other types of control devices or systems, including but not limited to motor drives, industrial sensors, vision systems, safety relays, barcode stampers, or other such devices.

The device- or equipment-level analytics can also be carried out by dedicated analytic devices that are physically separate from the industrial devices themselves, but installed in proximity to the devices to collect data associated with a machine or process and perform scalable equipment-level analytics for the machine or process. Using this architecture, analysis for any portion of an industrial enterprise can be performed at a high level with data from different sources, or can be scaled down to a specific device or data type if localized analytics is more suitable for a given analytical task.

Figure 16:
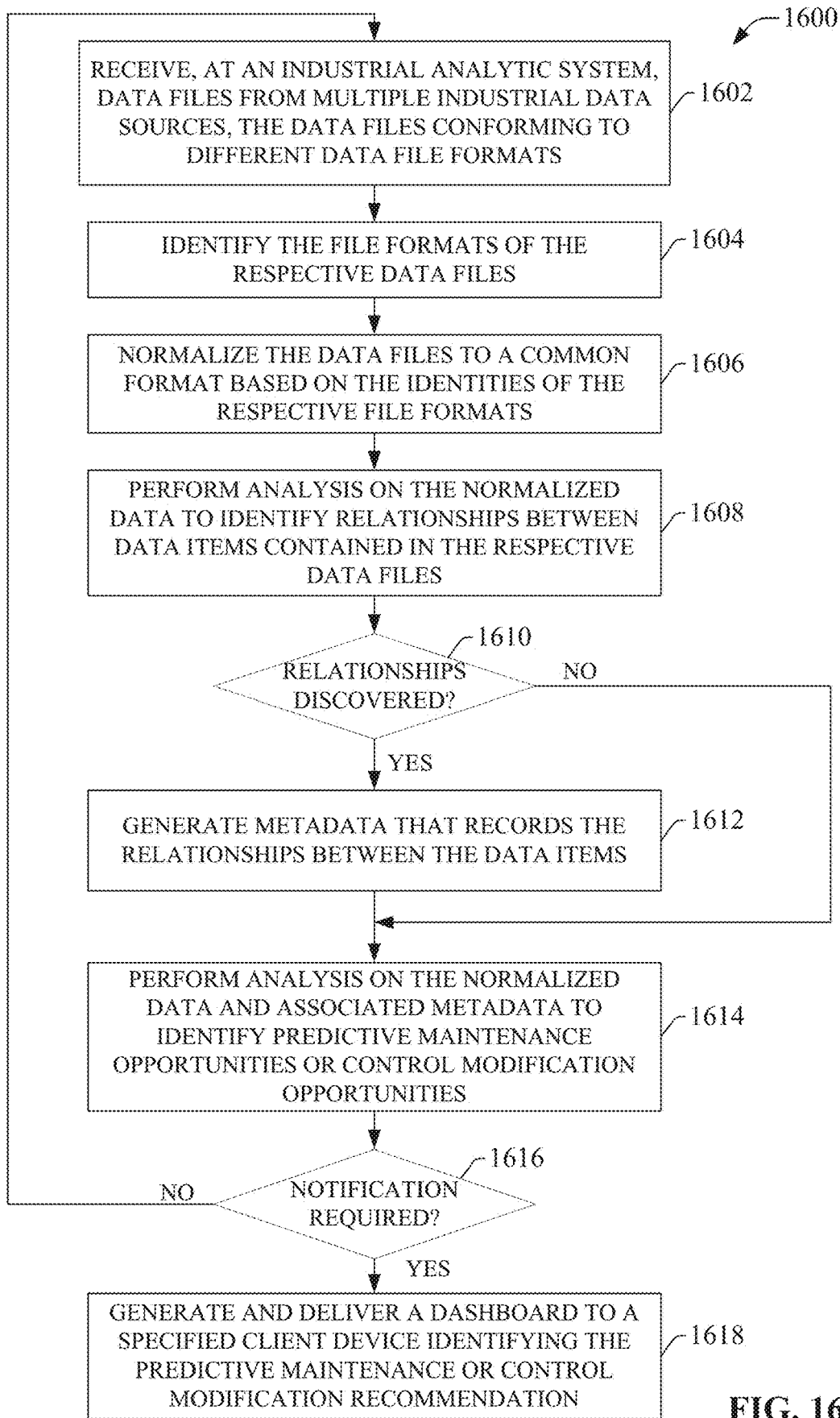
FIG. 16 is a flowchart of an example methodology for generating predictive maintenance or process control outcomes based on collection and analysis of data from diverse sources.
Figure 17:
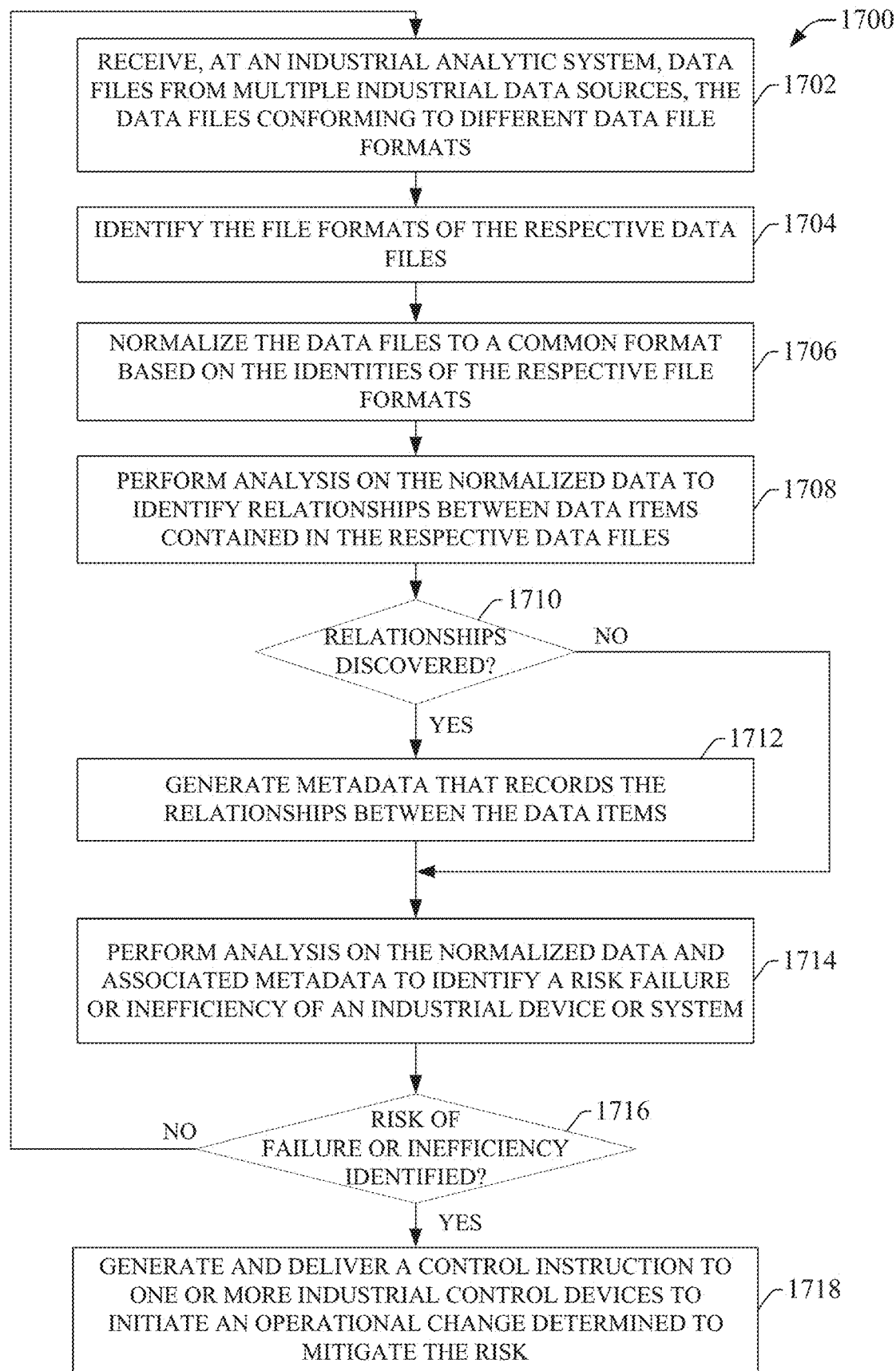
FIG. 17 is a flowchart of an example methodology for performing supplemental high-level control of an industrial machine, system, or process based on collection and analysis of data from diverse sources.

FIGS. 16-18 illustrate example methodologies in accordance with one or more embodiments of the subject application. While, for purposes of simplicity of explanation, the methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 16 illustrates an example methodology 1600 for generating predictive maintenance or process control outcomes based on collection and analysis of data from diverse sources. Initially, at 1602, data files from multiple industrial data sources are received at an industrial analytic system, where the data files conform to different data file formats. The multiple industrial data sources can include plant floor devices such as industrial controllers, HMI terminals, motor drives, vision systems, telemetry devices, sensors, data historians, power monitor devices, or other such sources. The data sources can also include higher level or business level sources such as inventory databases, maintenance schedule databases, work order databases, operator work schedules, accounting software, or other such sources. Data file formats can include two or more of spreadsheet files, log files, database files, word processing files, real-time control data read from industrial devices, streaming data, power monitor data, image data from a camera or an optical scanner, energy matrix data, data files from an inventory system, maintenance schedule data, purchase order data, or other such data file formats. The industrial analytic system can reside on an industrial device or edge device on the plant floor, a server residing on the plant floor or on an office level of an industrial enterprise, or on a cloud platform.

At 1604, the file formats of the data files received at step 1602 are identified. At 1606, the data files are normalized to a common format based on the identities of the file formats determined at step 1604 to yield normalized data.

At 1608, analysis is performed on the normalized data to identify relationships between data items contained in the respective data files. For example, relationships between data items can be recognized based on commonly named data fields or common data values discovered in different data files (e.g., date/time indicators, quantity indicator, descriptions, machine or production line names, etc.).

At 1610, a determination is made as to whether one or more relationships are discovered within the normalized data based on the analysis performed at step 1608. If a relationship is discovered (YES at step 1610), the methodology proceeds to step 1612, where metadata is generated that records the discovered relationships between data items. Alternatively, if no relationships are discovered (NO at step 1610), the methodology proceeds to step 1614 without generating metadata.

At 1614, analysis is performed on the normalized data and associated relationship metadata (if any) to identify predictive maintenance opportunities, to identify control modification opportunities, or to generate other analytic outcomes relating to performance and management of the industrial enterprise. Example analytics that can be performed on the normalized data and metadata can include analytics to learn or predict manufacturing floor outcomes, operational outcomes, device and equipment outcomes (e.g., predictive maintenance, life cycle alerts, optimal device configurations, etc.), production outcomes, quality outcomes, performance outcomes, etc.

At 1616, a determination is made as to whether a notification directed to a user is required based on the analysis performed at step 1614. If no notification is required (NO at step 1616), the methodology returns to step 1602, and the methodology continues collecting data files, orchestrating the data files, and performing the analysis described above. Alternatively, if a notification is required (YES at step 1616), the methodology proceeds to step 1618, where a dashboard is generated and delivered to one or more specified client devices, the dashboard rendering relevant information about the notification. In some embodiments, the dashboard can be customized in accordance with a user's role within the industrial enterprise (e.g., operator, plant manager, engineer, etc.) or context (e.g., current location, current work shift, etc.).

FIG. 17 illustrates an example methodology 1700 for performing supplemental high-level control of an industrial machine, system, or process based on collection and analysis of data from diverse sources. Steps 1702-1712 of methodology 1700 for collecting and pre-processing data are similar to steps 1602-1612 of methodology 1600 discussed above. Initially, at 1702, data files from multiple industrial data sources are received at an industrial analytic system, where the data files conform to different data file formats. At 1704, the file formats of the respective data files received at step 1702 are identified. At 1706, the data files are normalized to a common format based on the identities of the respective file formats determined at step 1704.

At 1708, analysis is performed on the normalized data to identify relationships between data items contained in the respective data files. At 1710, a determination is made as to whether relationships between data items are discovered based on the analysis performed at step 1708. If relationships are discovered (YES at step 1710), the methodology proceeds to step 1712, where metadata is generated that records the relationships between the data items. The methodology then proceeds to step 1714. If no relationships are discovered (NO at step 1710), the methodology proceeds to step 1714 without generating metadata at step 1712.

At 1714, analysis is performed on the normalized metadata generated at step 1706 and the associated metadata generated at 1712 to identify a risk of a failure or an inefficiency of an industrial device or a controlled industrial system. In some embodiments, the risk of failure or inefficiency can be based on a comparison of the normalized data and associated metadata with one or more performance models generated for a controlled industrial machine, system, or process. If no risk of failure or inefficiency is identified (NO at step 1716), the methodology returns to step 1702 and new data files continue to be received, processed, and analyzed. If a risk of failure or inefficiency is identified (YES at step 1716), the methodology proceeds to step 1718 where a control instruction is generated and delivered to one or more control devices. The control instruction is configured to initiate an operational change determined to mitigate the risk. The operational change may be an individual change in operation of a single industrial device, or a collective, coordinated change in operation of a machine, system, or process controlled by multiple industrial control devices.

Figure 18A:
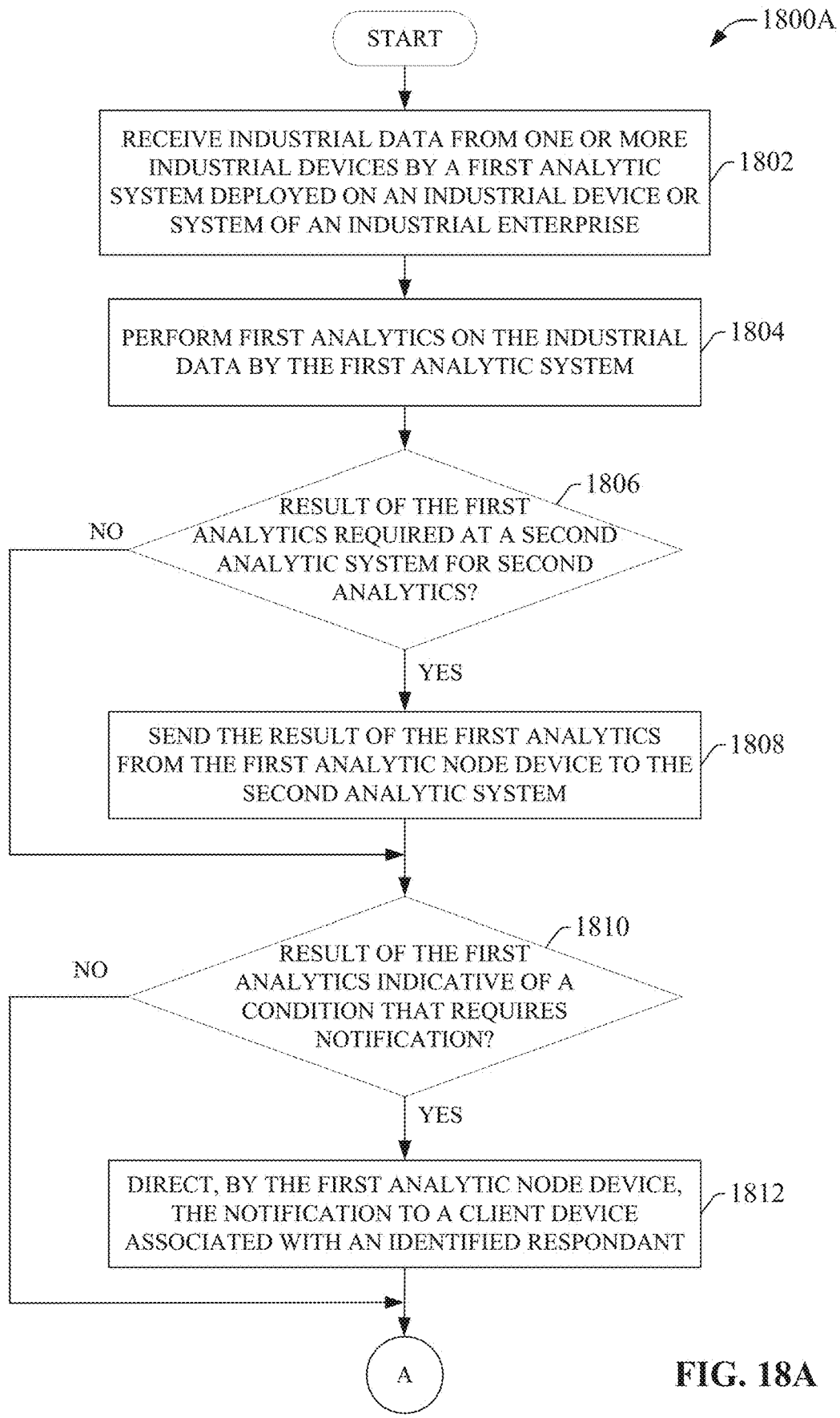
FIG. 18A is a flowchart of a first part of an example methodology for scaling analytics across device-level and higher-level analytic systems deployed within an industrial environment.

FIG. 18A illustrates a first part of an example methodology 1800A for scaling analytics across device-level and higher-level analytic systems deployed within an industrial environment. Initially, at 1802, industrial data is received from one or more industrial devices by a first analytic system deployed on an industrial device or system within an industrial enterprise. In example scenarios, the first analytic system can be deployed on a device or machine level (e.g., on an industrial controller, a motor drive, a telemetry device, or another industrial device), on a system level, or on an enterprise level of the industrial enterprise. The first analytic system may be a stand-alone analytic device having a wired or wireless network connection to the industrial devices, or may be integrated component of one of the industrial devices. In some embodiments, the data can be received, normalized, and contextualized using techniques similar to steps 1602-1612 of methodology 1600 described above.

At 1804, first analytics is performed on the industrial data collected at step 1802 by the first analytic system. At 1806, a determination is made as to whether the result of the first analytics performed at step 1804 is required at a second analytic system for second analytics to be performed at the second analytic system. In an example scenario, the second analytic system may reside on the same level of the industrial enterprise as the first analytic system. In such a scenario, the second analytic system may be associated with another set of industrial devices (that is, a different set of industrial devices from those associated with the first analytic system), and the first analytic system may determine that the result of the first analytics is relevant to operation of the other set of industrial devices. In another example scenario, the second analytic system may reside on a higher or lower level of the industrial enterprise relative to the first analytic system. The second analytic system may reside on a plant level of the industrial enterprise and execute analytics associated with higher level business aspects of the enterprise (e.g., inventory systems, accounting systems, ERP or MES systems, maintenance scheduling systems, etc.). In such scenarios, the first analytic system may determine that the result of the first analytics is relevant to decision making carried out by the second analytic system in connection with those higher level systems.

If it is determined that the result of the first analytics is required at the second analytic system (YES at step 1806), the methodology proceeds to step 1808, where the result of the first analytics is sent from the first analytic system to the second analytic system. Alternatively, if it is determined that the result of the first analytics is not required at the second analytic system device (NO at step 1806), the methodology proceeds to step 1810 without sending the result to the second analytic system.

At step 1810, a determination is made as to whether the result of the first analytics performed at step 1804 is indicative of a condition that requires delivery of a notification to one or more human operators or external systems. If it is determined that the result is indicative of a condition that requires delivery of a notification (YES at step 1812), the methodology proceeds to step 1812, where the notification is directed, by the first analytic system, to a device associated with an identified respondent (e.g., a client device associated with a human operator, a computing device on which a relevant external system executes, etc.). Alternatively, if the result of the first analytics is not indicative of a condition that requires delivery of a notification (NO at step 1810), the methodology proceeds to the second part of the methodology 1800B depicted in FIG. 18B without sending a notification.

Figure 18B:
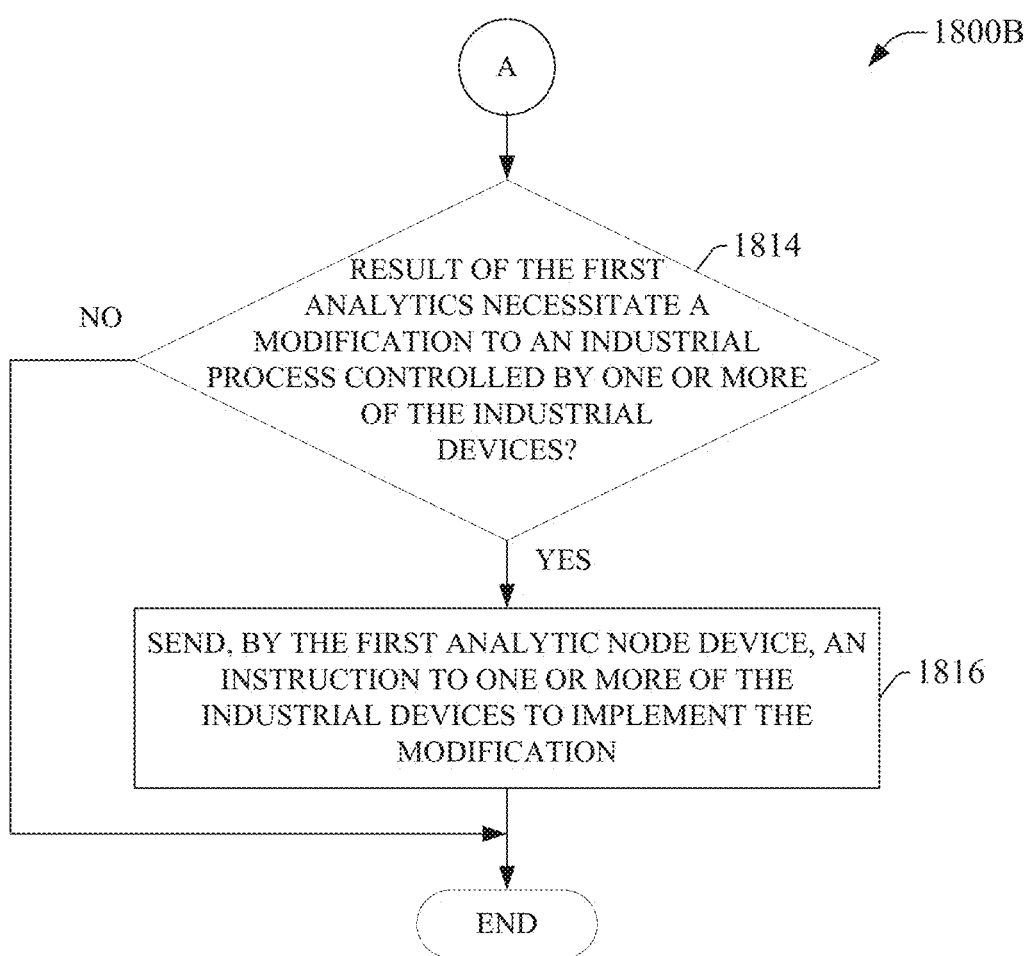
FIG. 18B is a flowchart of a second part of the example methodology for scaling analytics across device-level and higher-level analytic systems deployed within an industrial environment.

FIG. 18B illustrates a second part of the example methodology 1800B for scaling analytics across analytic systems deployed within an industrial environment. At 1814, a determination is made as to whether the result of the first analytics performed at step 1804 necessitates a modification to an industrial process controlled by one or more of the industrial devices. If it is determined that the result necessitates a modification to the industrial process (YES at step 1816), the methodology proceeds to step 1816, where the first analytic system sends an instruction to one or more of the industrial devices to implement the modification. Alternatively, if the result does not necessitate the modification to the industrial process (NO at step 1814), the methodology ends without sending the instruction.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
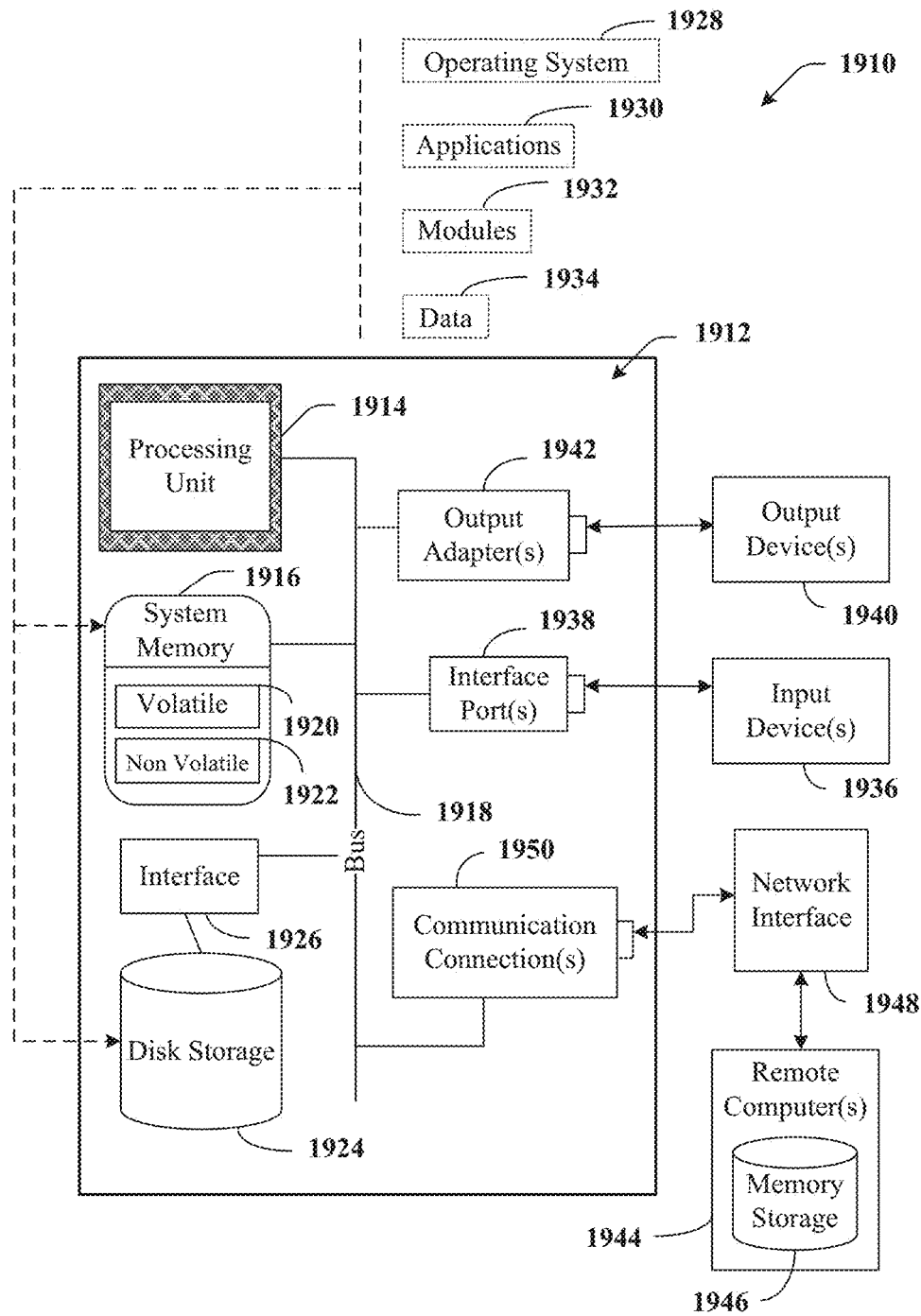
FIG. 19 is an example computing environment.
Figure 20:
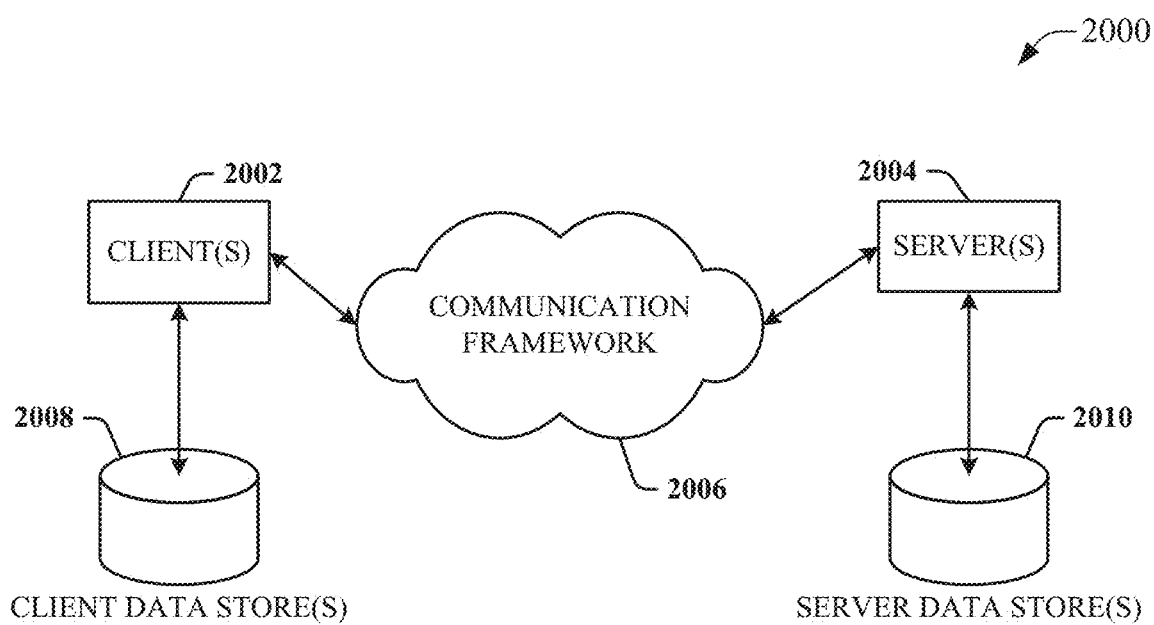
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented.

With reference to FIG. 19, an example environment 1910 for implementing various aspects of the aforementioned subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Multi-core microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable PROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also includes removable/non-removable, volatile/non-volatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapters 1942 are provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1948 can also encompass near field communication (NFC) or Bluetooth communication.

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 1408 that can be employed to store information local to the client(s) 2002. Similarly, the server(s) 2004 are operably connected to one or more server data store(s) 1410 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
 a device interface component configured to receive, from industrial devices and systems at one or more industrial facilities, data files that are formatted according to different file formats;
 a metadata generation component configured to generate relationship metadata identifying correlations between data items contained in the data files and to store the data items in association with the relationship metadata;
 an analysis component configured to
  identify, based on an analysis of a first subset of the data items and a first subset of the relationship metadata, ranges of performance metrics of the industrial devices and systems that correlate with a defined production outcome over multiple production cycles, wherein
   the performance metrics are at least one of machine or speed setpoints, control loop tuning parameters, machine mode settings, or sequences of manual control panel actuations, and
   the defined production outcome is at least one of production of parts that satisfy a quality criterion, production of at least a specified minimum number of parts, machine downtime durations that are less than a specified maximum duration, or energy consumption that is less than a specified maximum energy consumption,
  generate performance model data that records the ranges of the performance metrics, and
  identify a performance issue associated with one or more of the industrial devices and systems based on a comparison of the performance model data with a second subset of the data items and a second subset of the relationship metadata received subsequent to the first subset of the data items and the first subset of the relationship metadata; and
 a presentation component configured to send a dashboard interface to a client device, the dashboard interface rendering a notification of the performance issue and a recommended countermeasure determined to mitigate the performance issue.

2. The system of claim 1, wherein
the industrial devices and systems comprise at least one industrial controller having real-time control data stored thereon in association with data tags defined on the industrial controller, and one or more industrial automation devices operatively connected to the industrial controller, and
the real-time control data comprises input data received by the industrial controller from a first subset of the industrial devices and output data generated by the industrial controller and sent to a second subset of the industrial devices based on the input data in accordance with a control program executed by the industrial controller.

3. The system of claim 1, wherein the analysis component is further configured to
generate a digital twin of an industrial automation system based on another analysis of the data items and the relationship metadata, and
identify the performance issue based on an analysis of the digital twin.

4. The system of claim 1, wherein
the analysis component is further configured to
identify, based on another analysis of a third subset of the data items and a third subset of the relationship metadata, operator behaviors that correlate with a defined production outcome over multiple production cycles,
generate operator behavior model data that records the operator behaviors, and
identify, based on a comparison of the operator behavior model data with a fourth subset of the data items and a fourth subset of the relationship metadata received subsequent to the third subset of the data items and the third subset of the relationship metadata, a deviation of a current operator behavior from the operator behaviors defined by the operator behavior model data, and
the presentation component is further configured to, in response to identification of the deviation, send another dashboard interface to the client device or another client device, the other dashboard interface rendering a notification of the deviation.

5. The system of claim 1, wherein
the analysis component is further configured to
determine a modification to an operation of at least one of the industrial devices or systems that mitigates the performance issue, and
generate instruction data configured to, in response to execution by the at least one of the industrial devices or systems, implement the modification, and
the system further comprises:
a device interface component configured to send the instruction data to the at least one of the industrial devices or systems.

6. The system of claim 1, wherein the performance issue is at least one of a risk of producing an excessive amount of product waste, an increase in a number of part rejections, a risk of excessive wear on one or more devices of an automation system, or a risk of a failure of one of the industrial devices.

7. The system of claim 1, wherein
the analysis component is configured to identify, based on another analysis on the data items and the relationship metadata, a plant event that correlates to an excessive production loss, and
the dashboard interface renders an identification of the plant event.

8. The system of claim 7, wherein the plant event is at least one of a starvation of incoming materials at an upstream machine or production line, a plant or equipment power, part rejections due to quality check failures, or improper sequencing of manual operations by one or more operators.

9. The system of claim 1, wherein
the analysis component is further configured to
identify, based on another analysis of the data items and the relationship metadata, two or more sources of a same measured or calculated parameter of an automation system, and
identify, based on a comparison of a first subset of the data items corresponding to a first source of the two or more sources with a second subset of the data items corresponding to a second source of the two or more sources, that the first source is generating invalid data, and
the dashboard interface renders an indication that the first source is generating the invalid data based on the comparison.

10. The method of claim 1, wherein the identifying the performance issue comprises identifying at least one of a risk of producing an excessive amount of product waste, an increase in a number of part rejections, a risk of excessive wear on one or more devices of an automation system, or a risk of a failure of one of the industrial devices.

11. A method, comprising:
receiving, by a system comprising a processor, data files from industrial devices and systems at one or more industrial facilities, wherein the data files accord to different file formats;
generating, by the system, relationship metadata identifying correlations between data items contained in the data files;
storing, by the system, the data items in association with the relationship metadata;
identifying, based on an analysis of a first subset of the data items and a first subset of the relationship metadata, ranges of performance metrics of the industrial devices and systems that correlate with a defined production outcome over multiple production cycles, wherein
the performance metrics are at least one of machine or speed setpoints, control loop tuning parameters, machine mode settings, or sequences of manual control panel actuations, and
the defined production outcome is at least one of production of parts that satisfy a quality criterion, production of at least a specified minimum number of parts, machine downtime durations that are less than a specified maximum duration, or energy consumption that is less than a specified maximum energy consumption;
generating performance model data that records the ranges of the performance metrics;
identifying a performance issue associated with one or more of the industrial devices and systems based on a comparison of the performance model data with a second subset of the data items and a second subset of the relationship metadata received subsequent to the first subset of the data items and the first subset of the relationship metadata; and
sending, by the system, a dashboard interface to a client device, wherein the dashboard interface displays a notification of the performance issue and a recommended countermeasure determined to mitigate the performance issue.

12. The method of claim 11, wherein the receiving comprises receiving the data files from an industrial system comprising
at least one industrial controller having real-time control data stored thereon in association with data tags defined on the industrial controller, and one or more industrial automation devices operatively connected to the industrial controller,
wherein the real-time control data comprises input data received by the industrial controller from a first subset of the industrial devices and output data generated by the industrial controller and sent to a second subset of the industrial devices based on the input data in accordance with a control program executed by the industrial controller.

13. The method of claim 11, further comprising generating, by the system, a digital twin of an industrial automation system based on another analysis of the data items and the relationship metadata,
wherein the identifying the performance issue comprises identifying the performance issue further based on an analysis of the digital twin.

14. The method of claim 11, wherein the analysis is a first analysis, and the method further comprises:
identifying, by the system based on a second analysis of a third subset of the data items and a third subset of the relationship metadata, operator behaviors that correlate with a defined production outcome over multiple production cycles;
recording, by the system, the operator behaviors as operator behavior model data;
comparing, by the system, the operator behavior model data with a fourth subset of the data items and a fourth subset of the relationship metadata received subsequent to the third subset of the data items and the third subset of the relationship metadata;
identifying, by the system based on a result of the comparing, a deviation of a current operator behavior from the operator behaviors defined by the operator behavior model data; and
in response to the identifying of the deviation, sending another dashboard interface to the client device or another client device, wherein the other dashboard interface renders a notification of the deviation.

15. The method of claim 11, further comprising:
in response to the identifying the performance issue, determining, by the system based on another analysis of the data items and the relationship metadata, a change to an operation of at least one of the industrial devices or systems that will mitigate the performance issue;
generating, by the system, instruction data configured to, in response to execution by the at least one of the industrial devices or systems, implement the change to the operation; and
sending, by the system, the instruction data to the at least one of the industrial devices or systems.

16. The method of claim 11, further comprising:
identifying, by the system based on another analysis on the data items and the relationship metadata, a plant event that correlates to an excessive production loss; and
sending, by the system in response to the identifying the plant event, another dashboard to the client device or another client device, wherein the other dashboard displays an indication of the plant event,
wherein the plant event is at least one of a starvation of incoming materials at an upstream machine or production line, a plant or equipment power, part rejections due to quality check failures, or improper sequencing of manual operations by one or more operators.

17. The method of claim 11, wherein the analysis is a first analysis, and the method further comprises:
identifying, by the system based on a second analysis of the data items and the relationship metadata, two or more sources of a same measured or calculated parameter of an automation system;
comparing, by the system, a third subset of the data items corresponding to a first source of the two or more sources with a fourth subset of the data items corresponding to a second source of the two or more sources;
identifying, based on a result of the comparing, that the first source is generating invalid data; and
sending, by the system in response to the identifying, another dashboard interface to the client device or another client device, wherein the other dashboard interface displays an indication that the first source is generating the invalid data.

18. A non-transitory computer-readable medium having stored thereon executable components that, in response to execution, cause a system comprising a processor to perform operations, the operations comprising:
receiving data files from industrial devices and systems at one or more industrial facilities, wherein the data files accord to different file formats;
identifying correlations between data items contained in the data files;
generating relationship metadata recording the correlations;
storing the data items in association with the relationship metadata;
identifying, based on an analysis of a first subset of the data items and a first subset of the relationship metadata, ranges of performance metrics of the industrial devices and systems that correlate with a defined production outcome over multiple production cycles, wherein
the performance metrics are at least one of machine or speed setpoints, control loop tuning parameters, machine mode settings, or sequences of manual control panel actuations, and
the defined production outcome is at least one of production of parts that satisfy a quality criterion, production of at least a specified minimum number of parts, machine downtime durations that are less than a specified maximum duration, or energy consumption that is less than a specified maximum energy consumption;
generating performance model data that records the ranges of the performance metrics;
identifying a performance issue associated with one or more of the industrial devices and systems based on a comparison of the performance model data with a second subset of the data items and a second subset of the relationship metadata received subsequent to the first subset of the data items and the first subset of the relationship metadata; and
rendering a dashboard interface on a client device, wherein the dashboard interface displays a notification of the performance issue and a recommended countermeasure determined to mitigate the performance issue.

19. The non-transitory computer-readable medium of claim 18, wherein the analysis is a first analysis, and the operations further comprise:
identifying, based on a second analysis of a third subset of the data items and a third subset of the relationship metadata, operator behaviors that correlate with a defined production outcome over multiple production cycles;

recording the operator behaviors as operator behavior model data;

comparing the operator behavior model data with a fourth subset of the data items and a fourth subset of the relationship metadata received subsequent to the third subset of the data items and the third subset of the relationship metadata;

identifying based on a result of the comparing, a deviation of a current operator behavior from the operator behaviors defined by the operator behavior model data; and in response to the identifying of the deviation, rendering another dashboard interface on the client device or another client device, wherein the other dashboard interface renders a notification of the deviation.

20. The non-transitory computer-readable medium of claim 18, wherein the operations further comprise:

in response to the identifying the performance issue, determining, based on another analysis of the data items and the relationship metadata, a change to an operation of at least one of the industrial devices or systems that will mitigate the performance issue;

generating instruction data configured to, in response to execution by the at least one of the industrial devices or systems, implement the change to the operation; and sending the instruction data to the at least one of the industrial devices or systems.

\* \* \* \* \*